(12) United States Patent
Iwasaki

(10) Patent No.: US 9,075,176 B2
(45) Date of Patent: Jul. 7, 2015

(54) LIGHT GUIDE PLATE AND PLANAR LIGHTING DEVICE

(71) Applicant: FUJIFILM CORPORATION, Tokyo (JP)

(72) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 113 days.

(21) Appl. No.: 14/023,366

(22) Filed: Sep. 10, 2013

(65) Prior Publication Data

US 2014/0009966 A1 Jan. 9, 2014

Related U.S. Application Data

(63) Continuation of application No. PCT/JP2012/050792, filed on Jan. 17, 2012.

(30) Foreign Application Priority Data

Mar. 14, 2011 (JP) .................................. 2011-055497

(51) Int. Cl.
*F21V 7/04* (2006.01)
*F21V 8/00* (2006.01)

(52) U.S. Cl.
CPC ............ *G02B 6/0041* (2013.01); *G02B 6/0046* (2013.01); *G02B 6/005* (2013.01)

(58) Field of Classification Search
CPC .. G02B 6/0041; G02B 6/0046; G02B 6/0068; G02B 6/0011; G02B 6/0091; G02B 6/0073
USPC ........................................................ 362/617
See application file for complete search history.

(56) References Cited

U.S. PATENT DOCUMENTS 5,966,192 A 10/1999 Higuchi et al.
(Continued)

FOREIGN PATENT DOCUMENTS

| JP | 07-036037 A | 2/1995 |
| JP | 08-220346 A | 8/1996 |
| JP | 08-248233 A | 9/1996 |
| JP | 08-271739 A | 10/1996 |
| JP | 11-153963 A | 6/1999 |

(Continued)

OTHER PUBLICATIONS

International Preliminary Report on Patentability (Chapter I); PCT/JP2012/050792; Oct. 3, 2013.

*Primary Examiner* — Evan Dzierzynski
(74) *Attorney, Agent, or Firm* — Studebaker & Brackett PC

(57) ABSTRACT

The light guide plate has a first light incidence surface and a second light incidence surface which are provided on end sides of a light exit surface and are orthogonal to each other. The light guide plate includes two or more layers superposed on each other in a direction substantially perpendicular to the light exit surface and containing scattering particles at different particle concentrations. The thicknesses of the two or more layers in the direction substantially perpendicular to the light exit surface change so that a combined particle concentration of the light guide plate has, in directions perpendicular to the light incidence surfaces, a first local maximum value located on sides closer to the light incidence surfaces and a second local maximum value located at positions farther from the light incidence surfaces than positions of the first local maximum value and being larger than the first local maximum value.

13 Claims, 11 Drawing Sheets

(56) References Cited

U.S. PATENT DOCUMENTS

| | | | |
|---|---|---|---|
| 5,993,020 A | 11/1999 | Koike | |
| 6,217,184 B1 | 4/2001 | Koike et al. | |
| 7,991,257 B1 * | 8/2011 | Coleman | 385/129 |
| 2009/0103327 A1 | 4/2009 | Iwasaki et al. | |
| 2009/0103328 A1 | 4/2009 | Iwasaki et al. | |
| 2012/0170253 A1 * | 7/2012 | Park et al. | 362/97.1 |
| 2013/0114292 A1 * | 5/2013 | Brick et al. | 362/608 |

FOREIGN PATENT DOCUMENTS

| | | |
|---|---|---|
| JP | 2003-090919 A | 3/2003 |
| JP | 2004-171948 A | 6/2004 |
| JP | 2005-108676 A | 4/2005 |
| JP | 2005-302322 A | 10/2005 |
| JP | 4127897 B2 | 5/2008 |
| JP | 2009-117349 A | 5/2009 |
| JP | 2009-117357 A | 5/2009 |

* cited by examiner

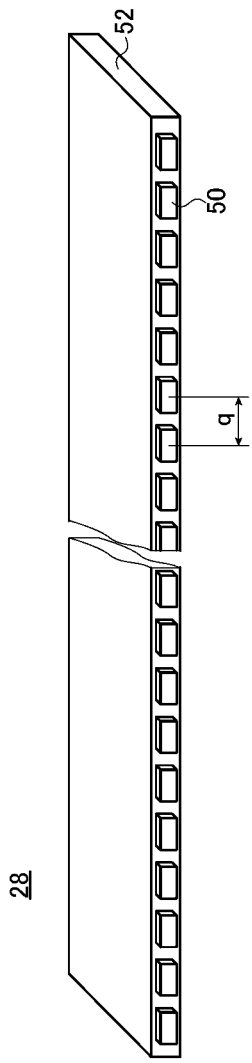
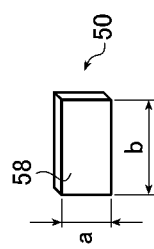

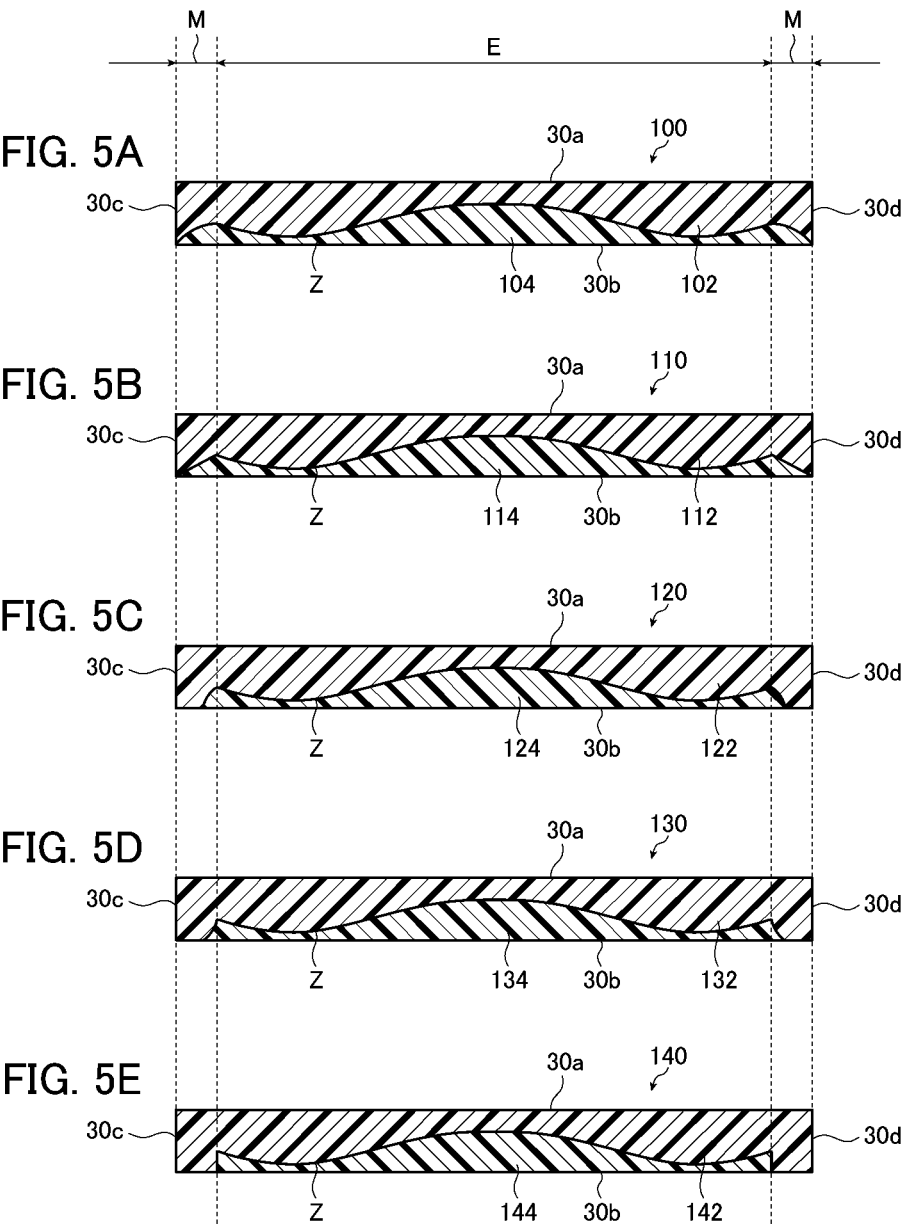

FIG. 6
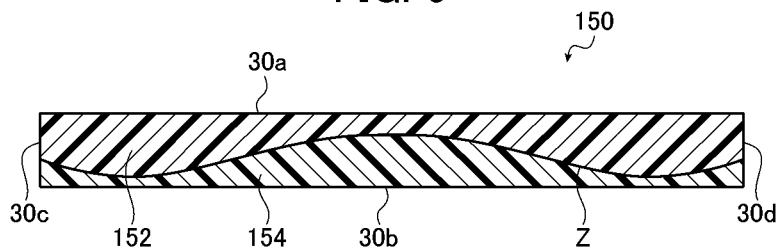
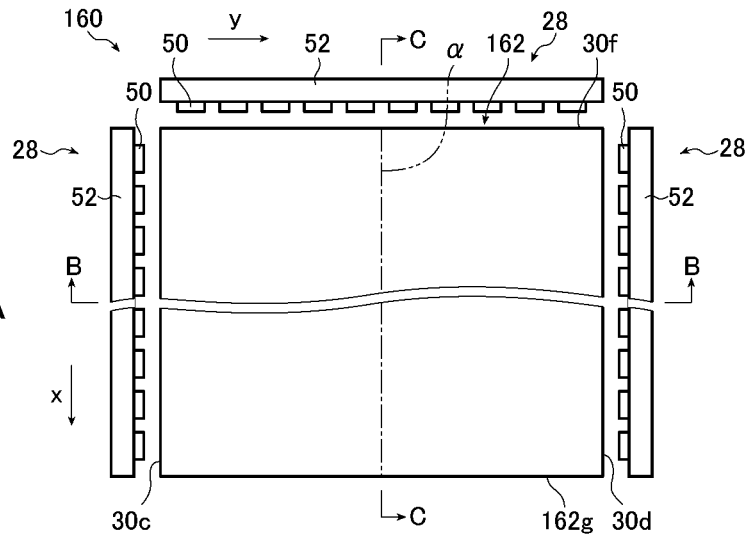
FIG. 7A
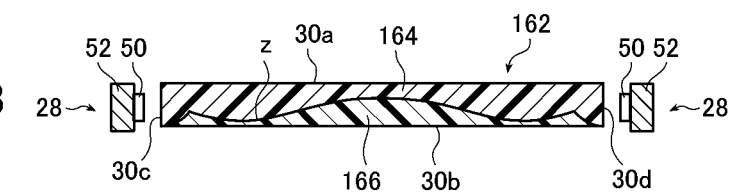
FIG. 7B
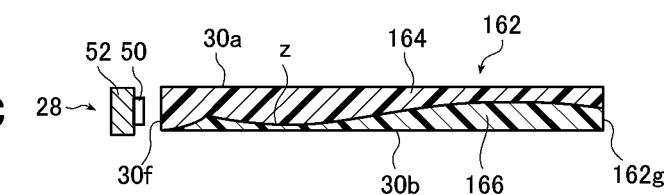
FIG. 7C

LIGHT GUIDE PLATE AND PLANAR LIGHTING DEVICE

BACKGROUND OF THE INVENTION

The present invention relates to a light guide plate and a planar lighting device that may be used in liquid crystal displays and the like.

A liquid crystal display uses a planar lighting device (a backlight unit) which illuminates a liquid crystal display panel by irradiation of light from the back side of the liquid crystal display panel. The backlight unit is configured using a light guide plate for diffusing light emitted from an illumination light source to illuminate the liquid crystal display panel and parts such as a prism sheet and a diffusion sheet for making outgoing light from the light guide plate uniform.

Currently, large-sized liquid crystal televisions predominantly use a so-called underneath type backlight unit including a light guide plate disposed immediately above an illumination light source. This type of backlight unit ensures uniform light amount distribution and necessary luminance by disposing a plurality of cold cathode tubes used as light sources behind the liquid crystal display panel and having white reflection surfaces inside the backlight unit.

However, the underneath type backlight unit requires a thickness of about 30 mm in a direction perpendicular to the liquid crystal display panel in order to make the light amount distribution uniform and further reduction in thickness is difficult to achieve.

On the other hand, an exemplary backlight unit that allows the thickness reduction includes one using a light guide plate which receives light emitted from an illumination light source, guides the received light in predetermined directions and emits the guided light through a light exit surface that is different from the surface through which the light entered.

As the backlight unit using the light guide plate as described above, there has been proposed a backlight unit of a type using a light guide plate in plate form which receives light through its lateral faces and emits the received light through the front face by incorporating scattering particles for scattering light in a transparent resin.

For example, JP 7-36037 A describes a light scattering and guiding light source device comprising a light scattering guide having at least one light incidence surface region and at least one light exit surface region and light source means for light incidence through the light incidence surface region, the light scattering guide having a region that has a tendency to decrease in thickness with increasing distance from the light incidence surface.

JP 8-248233 A describes a surface light source device comprising a light scattering guide, a prism sheet provided on the side of the light scattering guide closer to the light exit surface, and a reflector provided on the back side of the light scattering guide. JP 8-271739 A describes a liquid crystal display comprising a light emitting direction correcting element which is formed of a plate-shaped optical material and includes a light incidence surface having a repeated undulate pattern of prism arrays and a light exit surface having light diffusing properties. JP 11-153963 A describes a light source device comprising a light scattering guide provided with scattering ability inside and light supply means for supplying light through an end face portion of the light scattering guide.

Also proposed in addition to the above light guide plates are a light guide plate having a larger thickness at the center thereof than at an end on the light incidence side and at the opposite side end; a light guide plate having a reflection surface inclined in such a direction that the thickness of the light guide plate increases with increasing distance from a light entrance portion; and a light guide plate having such a shape that the distance between the front surface portion and the rear surface portion is the smallest at the light entrance portion and that the thickness of the light guide plate is the largest when the distance from the light entrance portion is the largest (see, for example, JP 2003-90919 A, JP 2004-171948 A, JP 2005-108676 A, JP 2005-302322 A and JP 8-220346 A).

In addition, JP 2009-117349 A describes a lighting device having a light guide plate of which the light exit surface is concave, and JP 2009-117357 A describes a light guide plate of which the light exit surface is downwardly convex (i.e., the light exit surface is concave).

JP 2009-117357 A discloses a two-layer light guide plate in which the interface between the first layer and the second layer is inclined in the directions approaching the light exit surface with increasing distance from the ends toward the center of the light guide plate (so that the cross section is in the shape of an isosceles triangle).

In addition, JP 4127897 B (JP 11-345512 A) describes a planar light source device comprising a sheet member in which at least one non-scattering light guide region and at least one scattering light guide region containing particles with a different refractive index uniformly dispersed in the same material as the non-scattering light guide region overlap each other, a light source lamp being mounted on one end face, the distribution state of the amount of light emitted from the main surface being controlled by locally adjusting the particle concentration in the sheet thickness of both the regions, the scattering light guide region including convex light guide blocks and the non-scattering light guide region including concave light guide blocks corresponding to the convex light guide blocks.

SUMMARY OF THE INVENTION

However, the backlight unit of, for example, a tandem type using a light guide plate of which the thickness decreases with increasing distance from the light source suffers from inferior light use efficiency to the underneath type in relation to the relative dimensions of the cold cathode tubes and the reflector although the backlight unit can be reduced in thickness. Further, in cases where the light guide plate used is so shaped as to receive cold cathode tubes in grooves formed therein, the light guide plate can be shaped in such a manner that the thickness decreases with increasing distance from the cold cathode tubes but the reduction in the thickness of the light guide plate increases the luminance just above the cold cathode tubes disposed in the grooves, thus causing uneven luminance on the light exit surface to stand out. In addition, the light guide plates of these types each have a complex shape and therefore increase machining costs, thus leading to increased costs when used in the backlight of a large-sized liquid crystal television having a screen size of, for example, 37 inches or more and in particular 50 inches or more.

JP 2003-90919 A, JP 2004-171948 A, JP 2005-108676 A and JP 2005-302322 A propose light guide plates of which the thickness is increased with increasing distance from the light incidence surface in order to achieve stable manufacturing while suppressing luminance unevenness (unevenness in the amount of light) using multireflection. However, these light guide plates are transparent members and allow light received from the light source to penetrate to the opposite end side and therefore need to have prisms or dot patterns on the lower surface thereof.

There is also a method in which a reflection member is provided at the opposite end from the light incidence surface to emit the incident light through the light exit surface by multireflection. However, an increase in size involves increases in thickness and weight of the light guide plate and the costs are also increased. Further, the light sources are projected into the light guide plate and perceived as such to cause uneven luminance and/or uneven illuminance.

In the lighting device described in JP 8-220346 A, the reflection surface is provided with serration grooves to serve as the diffuse reflection surface and therefore the light guide plate is to be increased in thickness in order to get larger in size. This involves an increase in weight and a complicated machining process, thus leading to increased costs.

The planar lighting device described in JP 2009-117349 A includes the light guide plate of which the light exit surface is definitely concave. However, scattering particles are uniformly mixed in the whole of the light guide plate, which makes it difficult to further reduce the thickness in terms of optical properties. In addition, the light incidence surface is small, which hinders improvement of the light use efficiency (light incidence efficiency) without increasing the weight of the light guide plate.

The light guide plate described in JP 2009-117357 A is certainly a light guide plate having two layers, the interface between the first layer and the second layer being inclined in the directions approaching the light exit surface with increasing distance from the ends toward the center of the light guide plate, and the light guide plate having a cross-sectional shape of an isosceles triangle. However, adjustment of the shape of the second layer to optimize the amount of outgoing light has not been taken into account.

Also in the planar light source device described in JP 4127897 B (JP 11-345512 A), adjustment of the shape of the scattering light guide region to optimize the amount of outgoing light has not been taken into account. Further, a large-sized light guide plate expands and contracts greatly due to ambient temperature and humidity changes and repeats expansion and contraction of 5 mm or more in a size of about 50 inches. Therefore, it is not known on which side a flat light guide plate warps, on the light exit surface side or the reflection surface side. If the light guide plate warps on the light exit surface side, the light guide plate expands and contracts to push up the liquid crystal panel to cause unevenness in light emitted from the liquid crystal display. To avoid this, one may consider preliminarily providing a large distance between the liquid crystal panel and the backlight unit. However, this may cause a problem that it is impossible to reduce the thickness of the liquid crystal display.

Further, when a backlight unit is to be made thinner and larger, the particle concentration of the scattering particles needs to be reduced in order to guide the light deep into the light guide plate but the reduced particle concentration of the scattering particles leads to insufficient diffusion of incident light in the vicinities of the light incidence surfaces. Therefore, light emitted from the vicinities of the light incidence surfaces may have visible bright lines (dark lines, unevenness) which are attributable to such causes as the intervals at which the light sources are disposed.

On the other hand, a high particle concentration of the scattering particles in the regions in the vicinities of the light incidence surfaces causes light having entered through the light incidence surfaces to be reflected in the regions in the vicinities of the light incidence surfaces. Therefore, the incident light may exit through the light incidence surfaces as return light, or outgoing light from the regions in the vicinities of the light incidence surfaces, which is not used because the regions are covered with the housing, may increase.

In recent years, with a view to further improving the light use efficiency, it has been required for the light amount distribution of outgoing light to be controlled and optimized for each local region of the light exit surface by arranging a plurality of point light sources such as LEDs and adjusting the amount of light for each light source. However, in cases where one light source is arranged on one lateral surface of the light guide plate or two light sources are arranged on two opposite lateral surfaces of the light guide plate, the amount of outgoing light can be adjusted in the direction in which LEDs are arranged but not in the direction orthogonal to the direction in which the LEDs are arranged. What is more, in the configuration in which LEDs are two-dimensionally arranged on the rear surface, the backlight unit has an increased thickness.

An object of the present invention is to solve the problems associated with the foregoing prior art and to provide a large-sized thin light guide plate which is high in light use efficiency, and is capable of emitting light with reduced unevenness in luminance and obtaining a so-called high-in-the-middle or bell-shaped brightness distribution, that is, such a distribution that an area around the center of the screen is brighter than the periphery as required of a flat large-screen liquid crystal television.

Another object of the invention is to provide a light guide plate capable of reducing return light, which is outgoing light through the light incidence surfaces after it once enters the light guide plate, and also reducing outgoing light from the region in the vicinities of the light incidence surfaces which is not used because the region is covered with the housing, whereupon the use efficiency of outgoing light through the effective region of the light exit surface can be improved.

Still another object of the invention is to provide a light guide plate capable of sufficiently diffusing incident light in the vicinities of the light incidence surfaces to prevent outgoing light from the vicinities of the light incidence surfaces from having visible bright lines (dark lines, unevenness) which are attributable to such causes as intervals at which the light sources are disposed.

Yet another object of the invention is to provide a light guide plate which is capable of controlling and optimizing the light amount distribution of outgoing light for each local region of the light exit surface, thereby improving the light use efficiency.

In order to achieve the above-described objects, the present invention provides a light guide plate comprising: a rectangular light exit surface; a first light incidence surface which is provided on a first end side of the light exit surface and through which light traveling in a direction substantially parallel to the light exit surface enters; a rear surface on an opposite side to the light exit surface; scattering particles dispersed in the light guide plate; a second light incidence surface which is provided on a second end side orthogonal to the first end side on which the first light incidence surface is provided and through which light traveling in the direction substantially parallel to the light exit surface enters; and two or more layers superposed on each other in a direction substantially perpendicular to the light exit surface and containing the scattering particles at different particle concentrations, wherein thicknesses of the two or more layers in the direction perpendicular to the light exit surface change so that a combined particle concentration of the light guide plate has, in a direction substantially perpendicular to the first light incidence surface, a first local maximum value located on a side closer to the first light incidence surface and a second local maximum value located at a position farther from the first light incidence surface than a position of the first local maximum value and being larger than the first local maximum value, and wherein the thicknesses of the two or more layers in the direction perpendicular to the light exit surface change so that the combined particle concentration of the light guide plate has, in a direction substantially perpendicular to the second light incidence surface, a first local maximum value located on a side closer to the second light incidence surface and a second local maximum value located at a position farther from the second light incidence surface than a position of the first local maximum value and being larger than the first local maximum value.

Preferably, the two or more layers comprise two layers including a first layer disposed on a side closer to the light exit surface and containing the scattering particles at a particle concentration Npo and a second layer disposed on a side closer to the rear surface and containing the scattering particles at a particle concentration Npr; a thickness of the second layer in the direction perpendicular to the light exit surface continuously changes in the direction perpendicular to the first light incidence surface so as to increase with increasing distance from the first light incidence surface, then decrease and subsequently increase again; and the thickness of the second layer in the direction perpendicular to the light exit surface continuously changes in the direction perpendicular to the second light incidence surface so as to increase with increasing distance from the second light incidence surface, then decrease and subsequently increase again.

Preferably, the two or more layers comprise two layers including a first layer disposed on a side closer to the light exit surface and containing the scattering particles at a particle concentration Npo and a second layer disposed on a side closer to the rear surface and containing the scattering particles at a particle concentration Npr, and a thickness of the second layer in the direction perpendicular to the light exit surface continuously changes so as to increase with increasing distance from the first and second light incidence surfaces, then decrease and subsequently increase again in all cross sections passing through a center of the light exit surface and perpendicular to the light exit surface.

The first local maximum value of the combined particle concentration is preferably positioned on the first light incidence surface in the direction substantially perpendicular to the first light incidence surface.

The first local maximum value of the combined particle concentration is preferably positioned on the second light incidence surface in the direction substantially perpendicular to the second light incidence surface.

Preferably, the light guide plate further comprises a third light incidence surface which is provided on a surface opposite to the first light incidence surface and through which light traveling in the direction substantially parallel to the light exit surface enters, and the combined particle concentration has, in the direction perpendicular to the first light incidence surface, the first local maximum value on each of sides where the first and third light incidence surfaces are formed.

Preferably, the light guide plate further comprises a fourth light incidence surface which is provided on a surface opposite to the second light incidence surface and through which light traveling in the direction substantially parallel to the light exit surface enters, and the combined particle concentration has, in the direction perpendicular to the second light incidence surface, the first local maximum value on each of sides where the second and fourth light incidence surfaces are formed.

Preferably, the light guide plate further comprises a third light incidence surface which is provided on a surface opposite to the first light incidence surface and through which light traveling in the direction substantially parallel to the light exit surface enters, and a fourth light incidence surface which is provided on a surface opposite to the second light incidence surface and through which light traveling in the direction substantially parallel to the light exit surface enters; the combined particle concentration has, in the direction perpendicular to the first light incidence surface, the first local maximum value on each of sides where the first and third light incidence surfaces are formed; and the combined particle concentration has, in the direction perpendicular to the second light incidence surface, the first local maximum value on each of sides where the second and fourth light incidence surfaces are formed.

The second layer preferably has a maximum thickness at a central portion of the light exit surface.

Npo and Npr preferably fall within ranges satisfying Npo=0 wt % and 0.01 wt %<Npr<1.1 wt %.

Alternatively, Npo and Npr preferably fall within ranges satisfying 0 wt %<Npo<0.15 wt % and Npo<Npr<1.1 wt %.

The rear surface is preferably a flat surface parallel to the light exit surface.

In order to achieve the above-described objects, the invention also provides a planar lighting device comprising: the above-described light guide plate; a light source unit including a plurality of point light sources disposed so as to face the first and second light incidence surfaces of the light guide plate and support members for supporting the plurality of point light sources; and a housing containing the light guide plate and the light source unit and having an opening on a side closer to the light exit surface of the light guide plate, the opening being smaller than the light exit surface, wherein the first local maximum value of the combined particle concentration of the light guide plate is located at a position corresponding to a vicinity of an edge of the opening of the housing.

According to the invention, the light guide plate has a thin shape, is high in light use efficiency, and is capable of emitting light with reduced unevenness in luminance and obtaining a so-called high-in-the-middle or bell-shaped brightness distribution, that is, such a distribution that an area around the center of the screen is brighter than the periphery as required of a flat large-screen liquid crystal television.

According to the invention, the scattering particle concentration in the vicinities of the light incidence surfaces can be reduced to decrease return light, which is outgoing light through the light incidence surfaces, and outgoing light from the region in the vicinities of the light incidence surfaces which is not used because the region is covered with the housing, whereupon the use efficiency of outgoing light through the effective region of the light exit surface can be improved.

According to the invention, the combined particle concentration has the first local maximum value in the vicinities of the light incidence surfaces and hence incident light through the light incidence surfaces can be sufficiently diffused to prevent bright lines (dark lines, unevenness), which are attributable to such causes as intervals at which the light sources are disposed, from occurring in the vicinities of the light incidence surfaces.

According to the invention, since the light guide plate has the first light incidence surface and the second light incidence surface orthogonal to the first light incidence surface and light enters the light guide plate from two directions, the light amount distribution of outgoing light can be controlled and optimized for each local region of the light exit surface to improve the light use efficiency.

BRIEF DESCRIPTION OF THE DRAWINGS

FIG. 4A is a perspective view showing the schematic configuration of a light source of the planar lighting device shown in FIGS. 1 and 2, and FIG. 4B is an enlarged schematic perspective view showing one of LEDs forming the light source shown in FIG. 4A.

FIGS. 5A to 5E are schematic cross-sectional views showing other examples of the light guide plate of the invention.

FIG. 6 is a schematic cross-sectional view showing another example of the light guide plate of the invention.

FIG. 7A is a schematic view of a planar lighting device which uses another example of the light guide plate of the invention; FIG. 7B is a cross-sectional view of FIG. 7A taken along line B-B; and FIG. 7C is a cross-sectional view of FIG. 7A taken along line C-C.

DETAILED DESCRIPTION OF THE INVENTION

A planar lighting device using a light guide plate according to the invention will be described below in detail with reference to preferred embodiments shown in the accompanying drawings.

Figure 1:
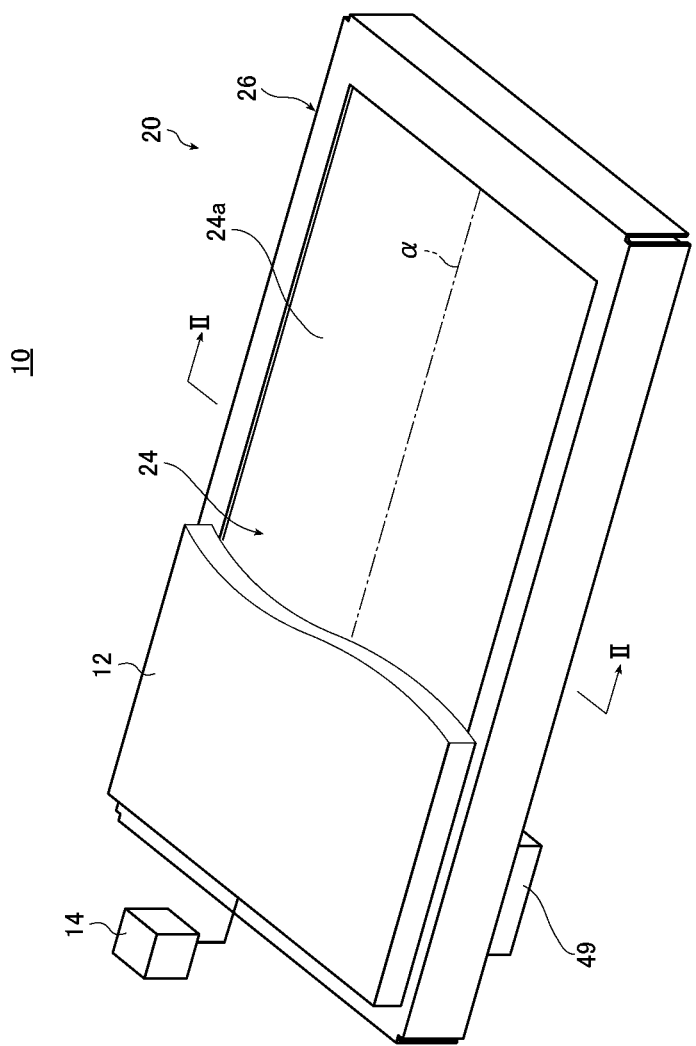
FIG. 1 is a schematic perspective view showing an embodiment of a liquid crystal display provided with a planar lighting device using a light guide plate according to the invention.
Figure 2:
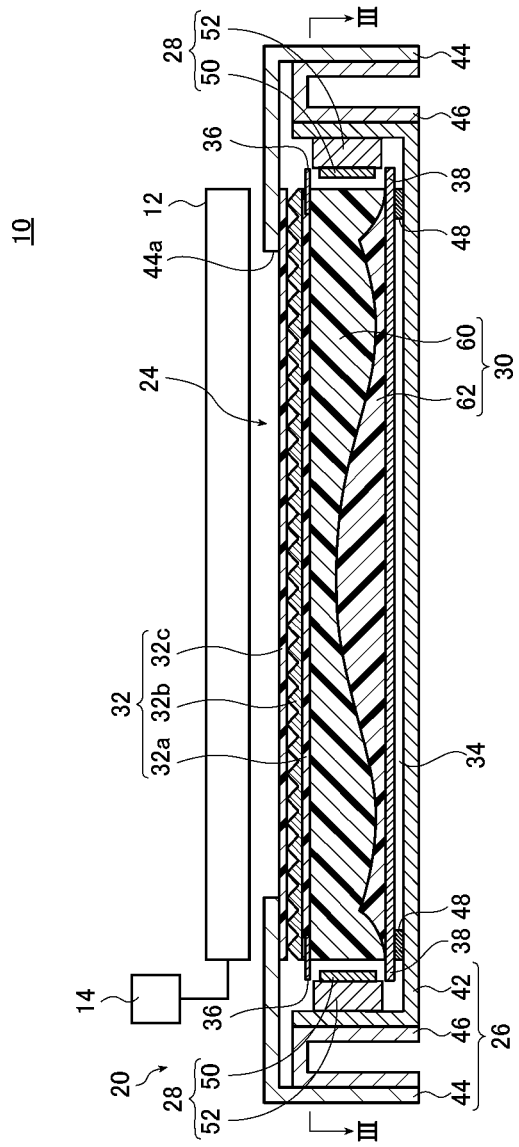
FIG. 2 is a cross-sectional view of the liquid crystal display shown in FIG. 1 taken along line II-II.

FIG. 1 is a perspective view schematically showing a liquid crystal display provided with the planar lighting device using the light guide plate according to the invention and FIG. 2 is a cross-sectional view of the liquid crystal display shown in FIG. 1 taken along line II-II.

Figure 3A:
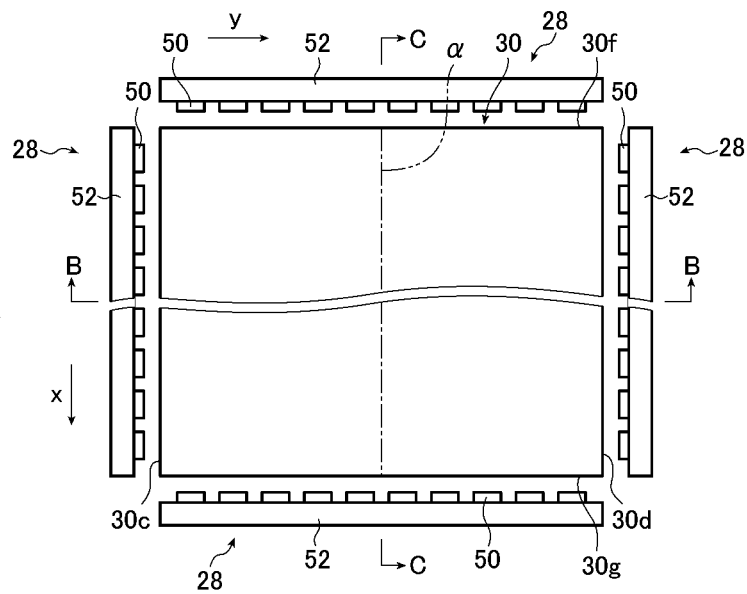
FIG. 3A is a view of the planar lighting device shown in FIG. 2 taken along line III-III.
Figure 3B:
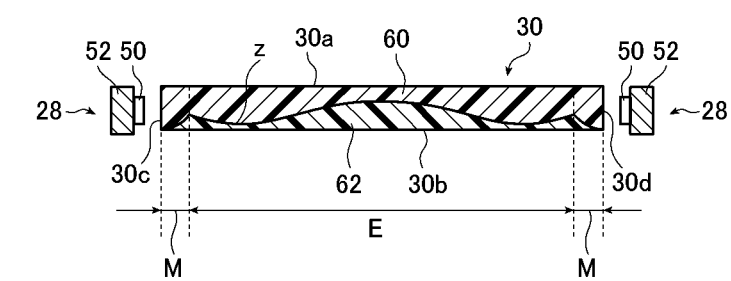
FIG. 3B is a cross-sectional view of FIG. 3A taken along line B-B.
Figure 3C:
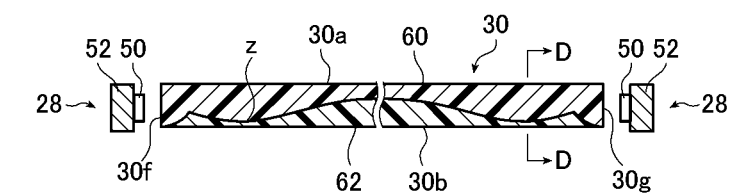
FIG. 3C is a cross-sectional view of FIG. 3A taken along line C-C.

FIG. 3A is a view of the planar lighting device (also referred to below as "backlight unit") shown in FIG. 2 taken along line III-III; FIG. 3B is a cross-sectional view of FIG. 3A taken along line B-B; and FIG. 3C is a cross-sectional view of FIG. 3A taken along line C-C.

A liquid crystal display 10 includes a backlight unit 20, a liquid crystal display panel 12 disposed on the side closer to a light exit surface of the backlight unit 20, and a drive unit 14 for driving the liquid crystal display panel 12. In FIG. 1, part of the liquid crystal display panel 12 is not shown to illustrate the configuration of the backlight unit.

In the liquid crystal display panel 12, an electric field is partially applied to liquid crystal molecules previously arranged in a specified direction to thereby change the orientation of the molecules. The resultant changes in refractive index having occurred in the liquid crystal cells are used to display characters, figures, images and the like on the surface of the liquid crystal display panel 12.

The drive unit 14 applies a voltage to transparent electrodes in the liquid crystal display panel 12 to change the orientation of the liquid crystal molecules, thereby controlling the transmittance of light passing through the liquid crystal display panel 12.

The backlight unit 20 is a lighting device for illuminating the whole surface of the liquid crystal display panel 12 from behind the liquid crystal display panel 12 and includes a light exit surface 24a of which the shape is substantially the same as an image display surface of the liquid crystal display panel 12.

As shown in FIGS. 1, 2 and 3A to 3D, the backlight unit 20 according to this embodiment includes a lighting device main body 24 having four light sources 28, a light guide plate 30 and an optical member unit 32, and a housing 26 having a lower housing 42, an upper housing 44, bent members 46 and support members 48. As shown in FIG. 1, a power unit casing 49 containing a plurality of power supplies for supplying the light sources 28 with electric power is provided on the back side of the lower housing 42 of the housing 26.

The components constituting the backlight unit 20 will be described below.

The lighting device main body 24 includes the four light sources 28 for emitting light, the light guide plate 30 for emitting the light from the light sources 28 as planar light, and the optical member unit 32 for scattering and diffusing the light emitted from the light guide plate 30 to further reduce the unevenness of the light.

First, the light sources 28 will be described.

FIG. 4A is a schematic perspective view schematically showing the configuration of the light source 28 of the backlight unit 20 shown in FIGS. 1 and 2; and FIG. 4B is an enlarged schematic perspective view showing only one LED chip of the light source 28 shown in FIG. 4A.

As shown in FIG. 4A, the light source 28 includes a plurality of light emitting diode chips (referred to below as "LED chips") 50 and a light source support 52.

The LED chip 50 is a chip of a light emitting diode emitting blue light, which has a phosphor applied on the surface thereof. It has a light-emitting face 58 with a predetermined area through which white light is emitted.

Specifically, when blue light emitted through the surface of the light emitting diode of the LED chip 50 passes through the phosphor, the phosphor emits fluorescence. Thus, the blue light emitted from the light emitting diode is combined with the light emitted as a result of the fluorescence of the phosphor to produce white light, which is emitted from the LED chip 50.

An example of the LED chip 50 includes a chip obtained by applying a YAG (yttrium aluminum garnet) phosphor to the surface of a GaN light emitting diode, an InGaN light emitting diode, and the like.

The light source support 52 is a plate member disposed so that one surface thereof faces a light incidence surface (30c, 30d, 30f or 30g) of the light guide plate 30.

The light source support 52 carries the LED chips 50 on its lateral surface facing the light incidence surface (30c, 30d, 30f or 30g) of the light guide plate 30 so that the LED chips 50 are spaced apart from each other at predetermined intervals. More specifically, the LED chips 50 constituting the light source 28 are arrayed along the longitudinal direction of the first light incidence surface 30c, the third light incidence surface 30d, the second light incidence surface 30f or the fourth light incidence surface 30g of the light guide plate 30 to be described later and are secured onto the light source support 52.

The light source support 52 is formed of a metal having high heat conductivity such as copper or aluminum and also serves as a heat sink which absorbs heat generated from the LED chips 50 and releases the generated heat to the outside. The light source support 52 may be equipped with fins capable of increasing the surface area and the heat dissipation effect or heat pipes for transferring heat to a heat dissipating member.

As shown in FIG. 4B, the LED chips 50 according to this embodiment each have such a rectangular prism shape that the sides in a direction orthogonal to the direction in which the LED chips 50 are arrayed are shorter than the sides lying in the direction in which the LED chips 50 are arrayed, that is, the sides lying in the direction of thickness of the light guide plate 30 to be described later (the direction perpendicular to a light exit surface 30a) are shorter sides. In other words, the LED chips 50 each have a shape satisfying b>a where "a" denotes the length of the side in a direction perpendicular to the light exit surface 30a of the light guide plate 30 and "b" denotes the length of the side in the array direction. Now, given "q" as the distance by which the arrayed LED chips 50 are spaced apart from each other, then q>b holds. Thus, the length "a" of the side of the LED chips 50 perpendicular to the light exit surface 30a of the light guide plate 30, the length "b" of the side in the array direction, and the distance "q" by which the LED chips 50 are spaced apart from each other preferably have a relationship satisfying q>b>a.

The LED chips 50 each having a rectangular prism shape allow a thinner design of the light source to be achieved while keeping the output of a large amount of light. A thinner light source 28, in turn, permits reduction of thickness of the backlight unit. Further, the number of LED chips that need to be arranged may be reduced.

While the LED chips 50 each preferably have a rectangular prism shape with the shorter sides lying in the direction of the thickness of the light guide plate 30 for a thinner design of the light source 28, the invention is not limited thereto and LED chips having various shapes including a square shape, a circular shape, a polygonal shape and an elliptical shape may be used.

Next, the light guide plate 30 will be described.

As shown in FIGS. 2 and 3A to 3D, the light guide plate 30 includes the rectangular light exit surface 30a; the first light incidence surface 30c and the third light incidence surface 30d formed at both ends on the longer sides of the light exit surface 30a and substantially perpendicular to the light exit surface 30a; the second light incidence surface 30f and the fourth light incidence surface 30g formed at both ends on the shorter sides of the light exit surface 30a and substantially perpendicular to the light exit surface 30a; and a flat rear surface 30b located on the opposite side from the light exit surface 30a, that is, on the back side of the light guide plate 30.

The four light sources 28 mentioned above are disposed so as to face the first light incidence surface 30c, the third light incidence surface 30d, the second light incidence surface 30f and the fourth light incidence surface 30g of the light guide plate 30, respectively. In this embodiment, the light-emitting face 58 of each LED chip 50 in the light sources 28 has substantially the same length as the first light incidence surface 30c, the third light incidence surface 30d, the second light incidence surface 30f and the fourth light incidence surface 30g in the direction substantially perpendicular to the light exit surface 30a.

In the following description, the first light incidence surface 30c, the third light incidence surface 30d, the second light incidence surface 30f and the fourth light incidence surface 30g are collectively referred to as "light incidence surfaces" in cases where it is not necessary to distinguish them from each other.

The light guide plate 30 is formed by kneading and dispersing scattering particles for light scattering into a transparent resin. Exemplary materials of the transparent resin that may be used for the light guide plate 30 include optically transparent resins such as PET (polyethylene terephthalate), PP (polypropylene), PC (polycarbonate), PMMA (polymethyl methacrylate), benzyl methacrylate, MS resin, and COP (cycloolefin polymer). In addition, fine particles including silicone particles (e.g., TOSPEARL (registered trademark)), silica particles, zirconia particles and dielectric polymer particles may be used for the scattering particles to be kneaded and dispersed in the light guide plate 30.

The light guide plate 30 is of a two-layer structure including a first layer 60 on the side closer to the light exit surface 30a and a second layer 62 on the side closer to the rear surface 30b. When the boundary between the first layer 60 and the second layer 62 is referred to as "interface z", the first layer 60 has a sectional region surrounded by the light exit surface 30a, the first light incidence surface 30c, the third light incidence surface 30d, the second light incidence surface 30f, the fourth light incidence surface 30g and the interface z, and the second layer 62 is a layer adjacent to the first layer on the side closer to the rear surface 30b and has a sectional region surrounded by the interface z and the rear surface 30b.

Now, the particle concentration of the scattering particles in the first layer 60 and that of the scattering particles in the second layer 62 are denoted by Npo and Npr, respectively. Then, Npo and Npr have a relationship expressed by Npo<Npr. Thus, in the light guide plate 30, the second layer 62 on the side closer to the rear surface 30b contains the scattering particles at a higher particle concentration than the first layer 60 on the side closer to the light exit surface 30a.

When seen in the cross section perpendicular to the longitudinal direction of the first light incidence surface 30c, the interface z between the first layer 60 and the second layer 62 smoothly changes so that the second layer 62 decreases in thickness from the light exit surface 30a at the bisector a (i.e., the central portion of the light exit surface) toward the first light incidence surface 30c and the third light incidence surface 30d, and then continuously changes so that the second layer 62 once increases in thickness in the vicinities of the first light incidence surface 30c and the third light incidence surface 30d and subsequently decreases in thickness again.

Figure 3D:
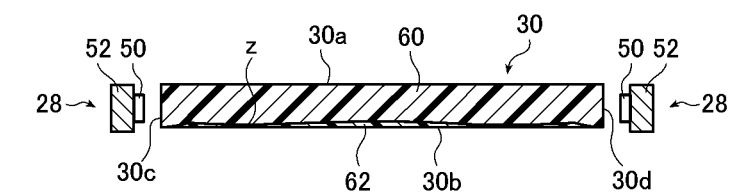
FIG. 3D is a cross-sectional view of FIG. 3C taken along line D-D.

The thickness of the second layer changes across the whole width depending on the position of the cross section perpendicular to the longitudinal direction of the first light incidence surface 30c as shown in FIGS. 3B and 3D, in other words, depending on the thickness of the second layer when seen in the cross section perpendicular to the longitudinal direction of the second light incidence surface 30f.

In addition, also when seen in the cross section perpendicular to the longitudinal direction of the second light incidence surface 30f, the interface z smoothly changes so that the second layer 62 decreases in thickness from the central portion of the light exit surface 30a toward the second light incidence surface 30f and the fourth light incidence surface 30g, and then continuously changes so that the second layer 62 once increases in thickness in the vicinities of the second light incidence surface 30f and the fourth light incidence surface 30g and subsequently decreases in thickness again.

Although not shown, the overall thickness changes according to the position of the cross section as in the above case.

More specifically, when seen in the cross section perpendicular to the longitudinal direction of the first light incidence surface 30c, the interface z includes a convex curve toward the light exit surface 30a in the central portion of the light guide plate 30, concave curves smoothly connected to the convex curve, and concave curves connected to the adjacent concave curves and communicating with ends of the first light incidence surface 30c and the third light incidence surface 30d on the side closer to the rear surface 30b.

In addition, when seen in the cross section perpendicular to the longitudinal direction of the second light incidence surface 30f, the interface z includes a convex curve toward the light exit surface 30a in the central portion of the light guide plate 30, concave curves smoothly connected to the convex curve, and concave curves connected to the adjacent concave curves and communicating with ends of the second light incidence surface 30f and the fourth light incidence surface 30g on the side closer to the rear surface 30b.

The thickness of the second layer 62 at the four light incidence surfaces is zero.

In other words, the second layer 62 has such a shape that its thickness decreases from the central portion of the light exit surface toward the end sides of the light exit surface, then increases once in the vicinities of the end sides, and subsequently decreases again.

By thus continuously changing the thickness of the second layer containing scattering particles at a higher particle concentration than that in the first layer 60 in the direction perpendicular to the light incidence surfaces such that the second layer has a first local maximum value as a result of an increased thickness in the vicinities of the light incidence surfaces and a second local maximum value at the central portion of the light guide plate having the largest thickness, the combined particle concentration of the scattering particles is changed so as to have the first local maximum value in the vicinity of each of the light incidence surfaces and the second local maximum value at the central portion of the light guide plate, the second local maximum value being larger than the first local maximum value.

The combined particle concentration as used herein denotes a concentration of scattering particles expressed using the amount of scattering particles added or combined in a direction substantially perpendicular to the light exit surface at a position spaced apart from one light incidence surface toward the opposite light incidence surface on the assumption that the light guide plate is a flat plate having the thickness at the light incidence surfaces throughout the light guide plate. In other words, the combined particle concentration denotes a quantity per unit volume of scattering particles or a weight percentage with respect to the base material of scattering particles added in a direction substantially perpendicular to the light exit surface at a position spaced apart from the light incidence surface on the assumption that the light guide plate is a flat light guide plate which has the thickness at the light incidence surfaces throughout the light guide plate and in which the concentration is the same.

The first local maximum value in the thickness (combined particle concentration) of the second layer 62 is located in the vicinity of the edge of an opening 44a of the upper housing 44 (FIG. 2). The region from the light incidence surfaces to their corresponding positions of the first local maximum value is located outside the opening 44a of the upper housing 44, that is, in the frame portion forming the opening 44a, and therefore does not contribute to the emission of light as the backlight unit 20. In other words, the region from the light incidence surfaces 30c and 30d to their corresponding positions of the first local maximum value is a so-called mixing zone M for diffusing light having entered through the light incidence surfaces. The region on the center side of the light guide plate from the mixing zone M, that is, the region corresponding to the opening 44a of the upper housing 44 is an effective screen area E and is a region contributing to the emission of light as the backlight unit 20.

According to the invention, by thus adjusting the combined particle concentration (thickness of the second layer) of the light guide plate 30 so that the concentration has the second local maximum value which is the largest in the central portion of the light guide plate, incident light through the light incidence surfaces can travel to positions farther from the light incidence surfaces even if the light guide plate is large and thin, whereupon outgoing light may have a luminance distribution which is high in the middle.

By adjusting the combined particle concentration so as to have the first local maximum value in the vicinities of the light incidence surfaces, light having entered through the light incidence surfaces can be sufficiently diffused in the vicinities of the light incidence surfaces to prevent outgoing light from the vicinities of the light incidence surfaces from having visible bright lines (dark lines, unevenness) which are attributable to such causes as intervals at which the light sources are disposed.

By adjusting the combined particle concentration so that the region on the sides closer to the light incidence surfaces than the positions where the combined particle concentration takes the first local maximum value has a lower combined particle concentration than the first local maximum value, return light, which is outgoing light through the light incidence surfaces after it once enters the light guide plate, and outgoing light from the region in the vicinities of the light incidence surfaces (mixing zone M), which is not used because the region is covered with the housing, can be reduced to improve the use efficiency of outgoing light through the effective region of the light exit surface (effective screen area E).

By setting the positions where the combined particle concentration takes the first local maximum value on the sides closer to the light incidence surfaces than the opening 44a of the upper housing 44, outgoing light from the region in the vicinities of the light incidence surfaces (mixing zone M), which is not used because the region is covered with the housing, can be reduced to improve the use efficiency of outgoing light through the effective region of the light exit surface (effective screen area E).

The adjustment of the shape of the interface z enables the luminance distribution (concentration distribution of the scattering particles) as well to be set as desired to improve the efficiency to the maximum extent possible.

According to the invention, the light guide plate 30 has the first light incidence surface 30c and the second light incidence surface 30f orthogonal to the first light incidence surface 30c and light enters the light guide plate 30 from two directions. Therefore, the light amount distribution of outgoing light can be controlled for each local region of the light exit surface 30a to optimize the light amount distribution of outgoing light for each local region of the light exit surface 30a, whereby the light use efficiency can be improved.

In addition, since the particle concentration of the layer on the side closer to the light exit surface (first layer) is reduced, the total amount of the scattering particles used can be reduced, thus leading to cost reduction.

In the illustrated embodiment, the combined particle concentration is adjusted so as to have the first local maximum value at the edge of the opening 44a of the upper housing 44. However, this is not the sole case of the invention. The combined particle concentration may have the first local maximum value at positions inside the opening 44a or in the frame portion of the surface having the opening 44a of the upper housing 44 (outside the opening 44a) as long as the first local maximum value of the combined particle concentration is located near the edge of the opening 44a of the upper housing 44. In other words, the combined particle concentration may have the first local maximum value at positions in the effective screen area E or at positions in the mixing zone M.

Although the light guide plate 30 is divided into the first layer 60 and the second layer 62 by the interface z, the first layer 60 and the second layer 62 are obtained by dispersing the same scattering particles in the same transparent resin and have an integrated structure, the only difference being the particle concentration. That is, the light guide plate 30 has different particle concentrations in the respective regions on both sides of the interface z which serves as a reference but the interface z is a virtual face and the first layer 60 is integrated with the second layer 62.

The light guide plate 30 as described above may be manufactured using an extrusion molding method or an injection molding method.

In the light guide plate 30 shown in FIG. 2, light emitted from the light sources 28 and allowed to enter the light guide plate 30 through the light incidence surfaces is scattered by scatterers (scattering particles) contained inside the light guide plate 30 as it travels through the inside of the light guide plate 30, and is emitted through the light exit surface 30a directly or after having been reflected by the rear surface 30b. Then, part of light may leak through the rear surface 30b but the light which leaked out is then reflected by a reflector 34 disposed on the side of the light guide plate 30 closer to the rear surface 30b to enter the light guide plate 30 again. The reflector 34 will be described later in detail.

Further, the particle concentration Npo of the scattering particles in the first layer 60 and the particle concentration Npr of the scattering particles in the second layer 62 preferably satisfy the relationships of 0 wt %<Npo<0.15 wt % and Npo<Npr<1.1 wt %.

If the first layer 60 and the second layer 62 of the light guide plate 30 satisfy the above relationships, the light guide plate 30 can guide the incident light to the inside (center) of the light guide plate 30 without scattering it so much in the first layer 60 having a lower particle concentration, and the light is scattered by the second layer having a higher particle concentration as it approaches the center of the light guide plate, thus enabling the amount of light emitted through the light exit surface 30a to be increased. In brief, the illuminance distribution which is high in the middle at a preferable ratio can be obtained while further enhancing the light use efficiency.

The particle concentration [wt %] as used herein denotes a ratio of the weight of the scattering particles to the weight of the base material.

Further, the particle concentration Npo of the scattering particles in the first layer 60 and the particle concentration Npr of the scattering particles in the second layer 62 preferably satisfy the relationships of Npo=0 wt % and 0.01 wt %<Npr<1.1 wt %. In other words, the light guide plate may be configured such that the scattering particles are not dispersed in the first layer 60 by kneading to guide incident light deep into the light guide plate 30, and the scattering particles are only kneaded and dispersed in the second layer 62 to scatter the light more as it comes closer to the center of the light guide plate, thereby increasing the amount of light emitted through the light exit surface 30a.

Since the first layer 60 and the second layer 62 of the light guide plate 30 satisfy the above relationships, the illuminance distribution which is high in the middle at a preferable ratio can be obtained while further enhancing the light use efficiency.

In all the cross sections passing through the center of the light exit surface 30a and perpendicular to the light exit surface 30a (i.e., the cross sections which are not perpendicular to the light incidence surfaces are also included), it is preferred for the thickness of the second layer 62 to continuously change such that the second layer 62 once increases in thickness with increasing distance from the light incidence surfaces, then decreases in thickness and subsequently increases in thickness again. In this way, outgoing light can have more advantageously a luminance distribution which is high in the middle and be prevented from having bright lines in the vicinities of the light incidence surfaces. Light can also be prevented from returning to improve the light use efficiency.

The thickness of the light guide plate of the invention is not particularly limited. The light guide plate may be several millimeters in thickness or may be a so-called light guide sheet which is a film with a thickness of 1 mm or less. A film-like light guide plate having two layers which contain scattering particles kneaded and dispersed therein at different particle concentrations may be produced by a method which involves forming as the first layer a base film containing scattering particles by extrusion molding or other process, applying a monomer resin liquid (transparent resin liquid) having scattering particles dispersed therein to the formed base film, and irradiating the base film with ultraviolet light or visible light to cure the monomer resin liquid to thereby form the second layer having a desired particle concentration, thus producing the film-like light guide plate. Alternatively, the film-like light guide plate may be produced by two-layer extrusion molding.

Also in cases where the light guide plate is a film-like light guide sheet with a thickness of 1 mm or less, formation of the light guide plate with two layers enables the illuminance distribution which is high in the middle at a preferable ratio to be obtained while further enhancing the light use efficiency.

In the illustrated light guide plate 30, the interface z has such a shape as to form a curved surface which is concave toward the light exit surface 30a in the region from the positions of the first local maximum value to their corresponding light incidence surfaces and which communicates with ends of the light incidence surfaces closer to the rear surface 30b. However, the invention is not limited thereto and the interface z in the region from the positions of the first local maximum value to their corresponding light incidence surfaces may have any of various shapes.

FIGS. 5A to 5E are schematic views showing other examples of the light guide plate of the invention.

Each of light guide plates 100, 110, 120, 130 and 140 shown in FIGS. 5A to 5E has the same configuration as the light guide plate 30 shown in FIGS. 3A to 3D except that the thickness of each of the first and second layers in the mixing zone M, that is, the shape of the interface z in the portion from the light incidence surfaces to the positions of the first local maximum value is changed. Therefore, like elements are denoted by the same reference numerals and the following description mainly focuses on the distinctive portions.

The light guide plate 100 shown in FIG. 5A includes a first layer 102 and a second layer 104 having a higher particle concentration than the first layer 102. The light guide plate 100 is only shown by a cross section perpendicular to the longitudinal direction of a first light incidence surface 30c but a cross section perpendicular to the longitudinal direction of a second light incidence surface 30f also has the same shape.

An interface z between the first layer 102 and the second layer 104 in a mixing zone M of the light guide plate 100 has such a shape as to include a curved surface which communicates with the positions of the first local maximum value, is convex toward a light exit surface 30a, and communicates with ends of the light incidence surfaces 30c and 30d closer to a rear surface 30b.

A light guide plate 110 shown in FIG. 5B includes a first layer 112 and a second layer 114 having a higher particle concentration than the first layer 112. The light guide plate 110 is only shown by a cross section perpendicular to the longitudinal direction of a first light incidence surface 30c but a cross section perpendicular to the longitudinal direction of a second light incidence surface 30f also has the same shape.

An interface z between the first layer 112 and the second layer 114 in a mixing zone M of the light guide plate 110 includes a flat surface connecting the positions of the first local maximum value to ends of the light incidence surfaces 30c and 30d closer to a rear surface 30b.

A light guide plate 120 shown in FIG. 5C includes a first layer 122 and a second layer 124 having a higher particle concentration than the first layer 122. The light guide plate 120 is only shown by a cross section perpendicular to the longitudinal direction of a first light incidence surface 30c but a cross section perpendicular to the longitudinal direction of a second light incidence surface 30f also has the same shape.

An interface z between the first layer 122 and the second layer 124 in a mixing zone M of the light guide plate 120 has such a shape as to include a curved surface which communicates with the positions of the first local maximum value, is convex toward a light exit surface 30a, and communicates with a rear surface 30b substantially in the middle of the mixing zone M.

A light guide plate 130 shown in FIG. 5D includes a first layer 132 and a second layer 134 having a higher particle concentration than the first layer 132. The light guide plate 130 is only shown by a cross section perpendicular to the longitudinal direction of a first light incidence surface 30c but a cross section perpendicular to the longitudinal direction of a second light incidence surface 30f also has the same shape.

An interface z between the first layer 132 and the second layer 134 in a mixing zone M of the light guide plate 130 has such a shape as to include a curved surface which communicates with the positions of the first local maximum value, is concave toward a light exit surface 30a, and communicates with a rear surface 30b substantially in the middle of the mixing zone M.

A light guide plate 140 shown in FIG. 5E includes a first layer 142 and a second layer 144 having a higher particle concentration than the first layer 142. The light guide plate 140 is only shown by a cross section perpendicular to the longitudinal direction of a first light incidence surface 30c but a cross section perpendicular to the longitudinal direction of a second light incidence surface 30f also has the same shape.

In a mixing zone M of the light guide plate 140, the light guide plate 140 only includes the first layer 142. In other words, an interface z has such a shape as to include flat surfaces passing through the positions of the first local maximum value and parallel to the light incidence surfaces 30c and 30d.

By forming the interface z so as to have such a shape that the second layer decreases in thickness from the positions of the first local maximum value toward their corresponding light incidence surfaces as in the light guide plates shown in FIGS. 5A to 5E, the region from the positions of the first local maximum value to their corresponding light incidence surfaces (mixing zone M) can be adjusted to have a lower combined particle concentration than the first local maximum value to reduce return light, which is outgoing light through the light incidence surfaces after it once enters the light guide plate, and outgoing light from the region in the vicinities of the light incidence surfaces (mixing zone M) which is not used because the region is covered with the housing, whereupon the use efficiency of outgoing light through the effective region of the light exit surface (effective screen area E) can be improved.

In a cross section perpendicular to the longitudinal direction of the light incidence surface, the concave and convex curves which form the interface z may be curves expressed by part of a circle or an ellipse, quadratic curves, curves expressed by polynomials, or curves obtained by combination thereof.

In the illustrated examples, the interface z between the first layer 60 and the second layer 62 is configured to have such a shape that the first local maximum value is located in the vicinity of each light incidence surface. However, this is not the sole case of the invention and the interface z may be configured to have such a shape that the first local maximum value is located on each light incidence surface.

FIG. 6 is a schematic view showing another example of the light guide plate of the invention.

A light guide plate 150 shown in FIG. 6 has the same configuration as the light guide plate 30 shown in FIGS. 3A to 3D except that the shape of the interface z is changed. Therefore, like elements are denoted by the same reference numerals and the following description mainly focuses on the distinctive portions.

The light guide plate 150 shown in FIG. 6 includes a first layer 152 and a second layer 154 having a higher particle concentration than the first layer 152. The light guide plate 150 is only shown by a cross section perpendicular to the longitudinal direction of a first light incidence surface 30c but a cross section perpendicular to the longitudinal direction of a second light incidence surface 30f also has the same shape.

When seen in a cross section perpendicular to the longitudinal direction of the first light incidence surface 30c, an interface z between the first layer 152 and the second layer 154 in the light guide plate 150 continuously changes so that the second layer 154 decreases in thickness from the central portion of a light exit surface 30a toward the first light incidence surface 30c and a third light incidence surface 30d, and then continuously changes so that the second layer 154 increases in thickness in the vicinities of the first light incidence surface 30c and the third light incidence surface 30d.

More specifically, when seen in a cross section perpendicular to the longitudinal direction of the first light incidence surface 30c, an interface z of the light guide plate 150 includes a convex curve toward a light exit surface 30a in the central portion of the light guide plate 30, and concave curves smoothly connected to the convex curve.

In other words, the interface z of the light guide plate 150 has such a shape as to include the second local maximum value in the central portion and the first local maximum value on the light incidence surfaces in the cross section perpendicular to the longitudinal direction of the light incidence surfaces.

As in the light guide plate shown in FIG. 6, by forming the interface z so that its shape changes so as to have the second local maximum value in the central portion of the light guide plate and the first local maximum value on the light incidence surfaces in the cross section perpendicular to the longitudinal direction of the light incidence surfaces, light having entered through the light incidence surfaces can travel to positions farther from the light incidence surfaces even in a large and thin light guide plate, whereby outgoing light may have a luminance distribution which is high in the middle.

By adjusting the combined particle concentration so as to have the first local maximum value on the light incidence surfaces, light having entered through the light incidence surfaces can be sufficiently diffused in the vicinities of the light incidence surfaces to prevent outgoing light from the vicinities of the light incidence surfaces from having visible bright lines (dark lines, unevenness) which are attributable to such causes as intervals at which the light sources are disposed.

The light exit surface $30a$ is flat in the illustrated examples. However, this is not the sole case and the light exit surface $30a$ may be concave. The light exit surface $30a$ having a concave shape can prevent the light guide plate from warping toward the light exit surface side upon expansion or contraction of the light guide plate due to heat and humidity, thus from touching the liquid crystal display 10.

The rear surface $30b$ is flat in the illustrated examples. However, this is not the sole case and the rear surface may be a concave surface, that is, a surface inclined in directions in which the thickness decreases with increasing distance from the light incidence surfaces. Alternatively, the rear surface may be a convex surface, that is, a surface inclined in directions in which the thickness increases with increasing distance from the light incidence surfaces.

The rear surface of the light guide plate having a convex shape can prevent the light guide plate from warping toward the light exit surface side upon expansion or contraction of the light guide plate due to heat and humidity, thus from touching the liquid crystal display 10.

Next, the optical member unit 32 will be described.

The optical member unit 32 is provided to reduce the luminance unevenness and illuminance unevenness of illumination light emitted through the light exit surface $30a$ of the light guide plate 30 before emitting the light through the light exit surface $24a$ of the lighting device main body 24. As shown in FIG. 2, the optical member unit 32 includes a diffusion sheet $32a$ for diffusing the illumination light emitted through the light exit surface $30a$ of the light guide plate 30 to reduce the luminance unevenness and illuminance unevenness; a prism sheet $32b$ having microprism arrays formed thereon parallel to the lines where the light exit surface $30a$ and the light incidence surfaces $30c$, $30d$ meet; and a diffusion sheet $32c$ for diffusing the illumination light emitted through the prism sheet $32b$ to reduce the luminance unevenness and the illuminance unevenness.

There is no particular limitation on the diffusion sheets $32a$ and $32c$ and the prism sheet $32b$ and known diffusion sheets and prism sheets may be used. For example, use may be made of the diffusion sheets and the prism sheets disclosed in paragraphs [0028] through [0033] of commonly assigned JP 2005-234397A.

While the optical member unit in the embodiment under discussion includes the two diffusion sheets $32a$ and $32c$ and the prism sheet $32b$ disposed between the two diffusion sheets, there is no particular limitation on the order in which the prism sheet and the diffusion sheets are arranged or the number of the sheets to be used. The materials of the prism sheet and the diffusion sheets are also not particularly limited, and use may be made of various optical members, as long as they can further reduce the unevenness in luminance and illuminance of the illumination light emitted through the light exit surface $30a$ of the light guide plate 30.

For example, the optical members used in addition to or instead of the above-described diffusion sheets and prism sheet may be transmittance adjusting members in which a large number of transmittance adjusters consisting of diffusion reflectors are disposed according to the luminance unevenness and the illuminance unevenness. Further, the optical member unit may be of a two-layer structure including one prism sheet and one diffusion sheet or including two diffusion sheets only.

Next, the reflector 34 of the lighting device main body 24 will be described.

The reflector 34 is provided to reflect light leaking through the rear surface $30b$ of the light guide plate 30 back into the light guide plate 30 and helps enhance the light use efficiency. The reflector 34 has a shape corresponding to the rear surface $30b$ of the light guide plate 30 and is formed so as to cover the rear surface $30b$. In this embodiment, the reflector 34 is formed into a shape contouring the profile of the rear surface $30b$ of the light guide plate 30 having a flat plane, that is, having a linear shape in cross section as shown in FIG. 2.

The reflector 34 may be formed of any material, as long as it can reflect light leaking through the rear surface $30b$ of the light guide plate 30. The reflector 34 may be formed, for example, of a resin sheet produced by kneading a filler with PET or PP (polypropylene) and then drawing the resultant mixture to form voids therein for increased reflectance; a sheet with a specular surface formed by, for example, aluminum vapor deposition on the surface of a transparent or white resin sheet; a metal foil such as an aluminum foil or a resin sheet carrying a metal foil; or a thin metal sheet having a sufficient reflectivity on the surface.

Upper light guide reflectors 36 are disposed between the light guide plate 30 and the diffusion sheet $32a$, i.e., on the side closer to the light exit surface $30a$ of the light guide plate 30, so as to cover the end portions of the light sources 28 and the light exit surface $30a$ of the light guide plate 30. In other words, each upper light guide reflector 36 is disposed so as to cover an area extending from part of the light exit surface $30a$ of the light guide plate 30 to part of the light source support 52 of the light source 28 in a direction parallel to the direction of the optical axis. Briefly, the four upper light guide reflectors 36 are disposed at four end portions of the light guide plate 30, respectively.

By thus providing the upper light guide reflectors 36, light emitted from the light sources 28 can be prevented from failing to enter the light guide plate 30 and leaking on the side of the light exit surface $30a$.

Thus, light emitted from the light sources 28 can efficiently enter the light guide plate 30 through the first light incidence surface $30c$, the third light incidence surface $30d$, the second light incidence surface $30f$ and the fourth light incidence surface $30g$ of the light guide plate 30 to enhance the light use efficiency.

Lower light guide reflectors 38 are disposed on the side closer to the rear surface $30b$ of the light guide plate 30 so as to cover part of the light sources 28. Ends of the lower light guide reflectors 38 closer to the center of the light guide plate 30 are connected to the reflector 34.

The upper light guide reflectors 36 and the lower light guide reflectors 38 may be formed of any of the above-mentioned various materials used to form the reflector 34.

By providing the lower light guide reflectors 38, light emitted from the light sources 28 can be prevented from failing to enter the light guide plate 30 and leaking on the side of the rear surface $30b$ of the light guide plate 30.

Thus, light emitted from the light sources 28 can efficiently enter the light guide plate 30 through the first light incidence surface 30c, the third light incidence surface 30d, the second light incidence surface 30f and the fourth light incidence surface 30g of the light guide plate 30 to enhance the light use efficiency.

While the reflector 34 is connected to the lower light guide reflectors 38 in the embodiment under discussion, this is not the sole case and they may be used as separate members.

The shapes and the widths of the upper light guide reflectors 36 and the lower light guide reflectors 38 are not particularly limited as long as light emitted from the light sources 28 can be reflected toward and allowed to enter through the light incidence surfaces and the light having entered the light guide plate 30 can be guided to the central side of the light guide plate 30.

In the embodiment under discussion, the upper light guide reflectors 36 are disposed between the light guide plate 30 and the diffusion sheet 32a. However, the upper light guide reflectors 36 may be disposed at any position without particular limitation. It may be disposed between the sheet members constituting the optical member unit 32 or between the optical member unit 32 and the upper housing 44.

Next, the housing 26 will be described.

As shown in FIG. 2, the housing 26 accommodates and supports the lighting device main body 24 and holds and secures the lighting device main body 24 from the side closer to the light exit surface 24a and the side closer to the rear surface 30b of the light guide plate 30. The housing 26 includes the lower housing 42, the upper housing 44, the bent members 46 and the support members 48.

The lower housing 42 is open at the top and has a shape formed by a bottom section and lateral sections provided upright on the four sides of the bottom section. In brief, it is substantially in the shape of a rectangular box open on one side. As shown in FIG. 2, the lower housing 42 supports the lighting device main body 24 placed therein from above on the bottom section and the lateral sections and covers the faces of the lighting device main body 24 except the light exit surface 24a, i.e., the face opposite from the light exit surface 24a of the lighting device main body 24 (rear surface) and the lateral faces.

The upper housing 44 has the shape of a rectangular box; it has at the top a rectangular opening which is smaller than the rectangular light exit surface 24a of the lighting device main body 24 and is open at the bottom.

As shown in FIG. 2, the upper housing 44 is placed from above the lighting device main body 24 and the lower housing 42 (from the light exit surface side) to cover the lighting device main body 24 and the lower housing 42 holding the main body therein, including the four lateral sections.

The bent members 46 have a concave (U-shaped) sectional profile that is always identical throughout their length. That is, each bent member 46 is a bar-shaped member having a U-shaped profile in cross section perpendicular to the direction in which they extends.

As shown in FIG. 2, the bent members 46 are fitted between the lateral faces of the lower housing 42 and the lateral faces of the upper housing 44 such that the outer face of one of the parallel sections of the U-shaped member is connected with the lateral section of the lower housing 42 whereas the outer face of the other parallel section is connected with the lateral section of the upper housing 44.

Various known methods including a method using bolts and nuts and a method using an adhesive may be used to join the lower housing 42 to the bent members 46 and the bent members 46 to the upper housing 44.

By thus providing the bent members 46 between the lower housing 42 and the upper housing 44, the rigidity of the housing 26 can be increased to prevent the light guide plate 30 from warping. As a result, for example, light having no or reduced luminance unevenness and illuminance unevenness can be efficiently emitted. Further, even in cases where the light guide plate used is liable to warp, the warp can be corrected more reliably or the warping of the light guide plate can be prevented more reliably, thereby allowing light having no or reduced luminance unevenness and illuminance unevenness to be emitted through the light exit surface.

Various materials such as metals and resins may be used to form the upper housing, the lower housing and the bent members of the housing. The material used is preferably light in weight and very strong.

While the bent members are provided as separate members in the embodiment under discussion, they may be integrated with the upper housing or the lower housing. Alternatively, the housing may not have the bent members.

The support members 48 are rod members each having an identical shape in cross section perpendicular to the direction in which they extend.

As shown in FIG. 2, the support members 48 are provided between the reflector 34 and the lower housing 42, more specifically, between the reflector 34 and the lower housing 42 at positions corresponding to the ends of the rear surface 30b of the light guide plate 30 on the sides closer to the first light incidence surface 30c and the third light incidence surface 30d, respectively. The support members 48 thus secure the light guide plate 30 and the reflector 34 to the lower housing 42 and support them.

The light guide plate 30 can be brought into close contact with the reflector 34 by supporting the reflector 34 with the support members 48. Furthermore, the light guide plate 30 and the reflector 34 can be secured to the lower housing 42 at predetermined positions.

While the support members are provided as separate members in the embodiment under discussion, the invention is not limited thereto and they may be integrated with the lower housing 42 or the reflector 34. To be more specific, projections may be formed in part of the lower housing 42 to serve as support members or projections may be formed in part of the reflector 34 to serve as support members.

The location of the support members is also not particularly limited and they may be provided at any positions between the reflector and the lower housing. To stably hold the light guide plate, the support members are preferably provided on the end sides of the light guide plate, that is, near the first light incidence surface 30c and the third light incidence surface 30d in the embodiment under discussion.

The shape of the support members 48 is not particularly limited and the support members 48 may have any of various shapes. The support members 48 may also be formed of various materials. For example, a plurality of support members may be provided at predetermined intervals.

Further, the support members may have such a shape as to fill the whole space formed by the reflector and the lower housing. More specifically, the support members may have a surface shape contouring the profile of the reflector on the reflector side and a surface shape contouring the profile of the lower housing on the lower housing side. In cases where the whole surface of the reflector is thus supported by the support members, the reflector can be reliably prevented from being separated from the light guide plate, and light reflected by the reflector can be prevented from causing luminance unevenness and illuminance unevenness.

The backlight unit 20 is basically configured as described above.

In the backlight unit 20, light emitted from the light sources 28 provided on the four end faces of the light guide plate 30 enters through the light incidence surfaces of the light guide plate 30. The incident light through the respective surfaces is scattered by scatterers contained inside the light guide plate 30 as the light travels inside the light guide plate 30 and is emitted through the light exit surface 30a directly or after being reflected by the rear surface 30b. Then, part of the light leaking through the rear surface is reflected by the reflector 34 to enter the light guide plate 30 again.

Thus, light emitted through the light exit surface 30a of the light guide plate 30 is transmitted through the optical member unit 32 and emitted through the light exit surface 24a of the lighting device main body 24 to illuminate the liquid crystal display panel 12.

The liquid crystal display panel 12 uses the drive unit 14 to control the light transmittance according to the position so as to display characters, figures, images, etc. on the surface of the liquid crystal display panel 12.

In this embodiment, the four light sources are arranged on the four light incidence surfaces of the light guide plate and light is allowed to enter from the four sides of the light guide plate. However, the light guide plate is not limited to this but may be configured such that two light sources are arranged on two light incidence surfaces of the light guide plate which are orthogonal to each other. Alternatively, the light guide plate may be configured such that two opposite light sources and one light source orthogonal to the two light sources are arranged on three light incidence surfaces of the light guide plate. Reduction in number of light sources enables the number of parts and hence the costs to be reduced.

In cases where the light guide plate is configured such that the light source is disposed only on one side of the two opposite surfaces, the interface z of the light guide plate may have an asymmetric shape.

FIG. 7A is a partial schematic view showing a backlight unit which uses another example of the light guide plate of the invention; FIG. 7B is a cross-sectional view of FIG. 7A taken along line B-B; and FIG. 7C is a cross-sectional view of FIG. 7A taken along line C-C. Since a backlight unit 160 shown in FIGS. 7A to 7C has the same configuration as the backlight unit 20 except that the light guide plate 30 is replaced by a light guide plate 162 and three light sources 28 are used, like elements are denoted by the same reference numerals and the following description mainly focuses on the distinctive portions.

The backlight unit 160 shown in FIG. 7A includes the light guide plate 162 and the three light sources 28 disposed so as to face a first light incidence surface 30c, a third light incidence surface 30d and a second light incidence surface 30f of the light guide plate 162.

The light guide plate 162 includes a lateral surface 162g which is a surface opposite to the second light incidence surface 30f.

The light guide plate 162 includes a first layer 164 on the side closer to a light exit surface 30a and a second layer 166 on the side closer to a rear surface 30b. When seen in the cross section perpendicular to the longitudinal direction of the first light incidence surface 30c, an interface z between the first layer 164 and the second layer 166 continuously changes so that the second layer 166 decreases in thickness from the central portion of the light exit surface 30a toward the first light incidence surface 30c and the third light incidence surface 30d, and then continuously changes so that the second layer 166 once increases in thickness in the vicinities of the first light incidence surface 30c and the third light incidence surface 30d and subsequently decreases in thickness again. When seen in the cross section perpendicular to the longitudinal direction of the second light incidence surface 30f, the interface z continuously changes so that the second layer 166 increases in thickness from the second light incidence surface 30f toward the lateral surface 162g, then once decreases in thickness, then increases in thickness again and subsequently decreases in thickness on the side closer to the lateral surface 162g.

More specifically, when seen in the cross section perpendicular to the longitudinal direction of the second light incidence surface 30f, the interface z includes a convex curve toward the light exit surface 30a on the side closer to the lateral surface 162g, a concave curve smoothly connected to the convex curve, and a concave curve connected to the adjacent concave curve and communicating with one end of the second light incidence surface 30f on the side closer to the rear surface 30b. The thickness of the second layer 166 at the second light incidence surface 30f is zero.

In other words, when seen in the cross section perpendicular to the longitudinal direction of the second light incidence surface 30f, the combined particle concentration of the scattering particles (thickness of the second layer) is changed so as to have the first local maximum value in the vicinity of the second light incidence surface 30f and the second local maximum value on the side closer to the lateral surface 162g beyond the central portion of the light guide plate, the second local maximum value being larger than the first local maximum value.

Figure 8A:
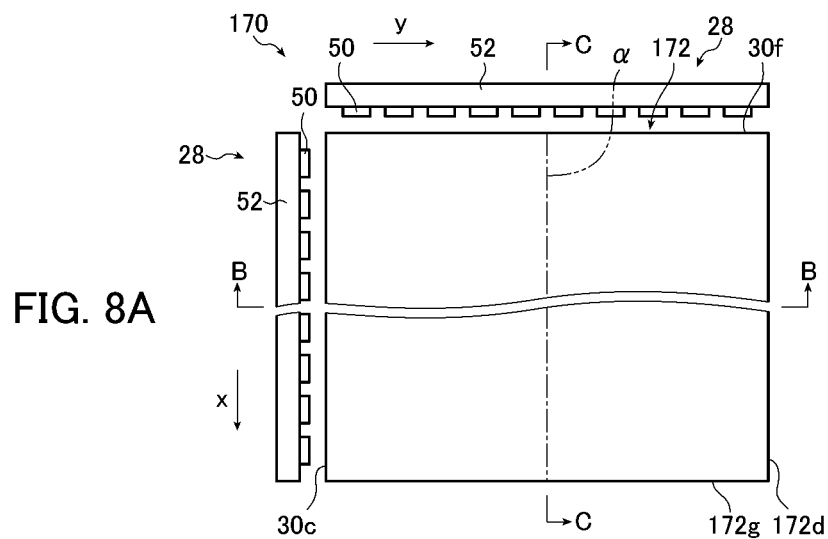
FIG. 8A is a schematic view of a planar lighting device which uses still another example of the light guide plate of the invention.
Figure 8B:
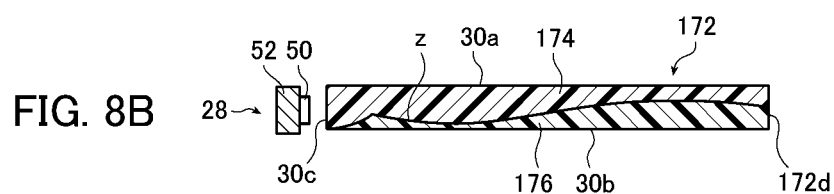
FIG. 8B is a cross-sectional view of FIG. 8A taken along line B-B.
Figure 8C:
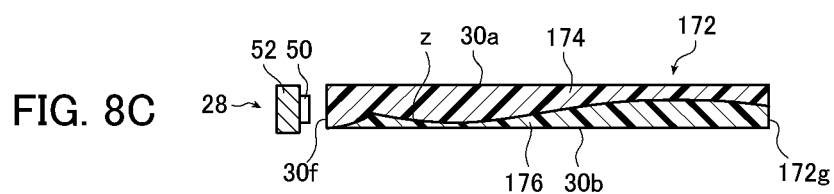
FIG. 8C is a cross-sectional view of FIG. 8A taken along line C-C.

FIG. 8A is a partial schematic view showing a backlight unit which uses still another example of the light guide plate of the invention; FIG. 8B is a cross-sectional view of FIG. 8A taken along line B-B; and FIG. 8C is a cross-sectional view of FIG. 8A taken along line C-C. Since a backlight unit 170 shown in FIGS. 8A to 8C has the same configuration as the backlight unit 20 except that the light guide plate 30 is replaced by a light guide plate 172 and two light sources 28 are used, like elements are denoted by the same reference numerals and the following description mainly focuses on the distinctive portions.

The backlight unit 170 shown in FIG. 8A includes the light guide plate 172 and the two light sources 28 disposed so as to face a first light incidence surface 30c and a second light incidence surface 30f of the light guide plate 172.

The light guide plate 172 includes a lateral surface 172d which is a surface opposite to the first light incidence surface 30c and a lateral surface 172g which is a surface opposite to the second light incidence surface 30f.

The light guide plate 172 includes a first layer 174 on the side closer to a light exit surface 30a and a second layer 176 on the side closer to a rear surface 30b. When seen in the cross section perpendicular to the longitudinal direction of the first light incidence surface 30c, an interface z between the first layer 174 and the second layer 176 continuously changes so that the second layer 176 increases in thickness from the first light incidence surface 30c toward the lateral surface 172d, then once decreases in thickness, then increases in thickness again and subsequently decreases in thickness on the side closer to the lateral surface 172d. When seen in the cross section perpendicular to the longitudinal direction of the second light incidence surface 30f, the interface z continuously changes so that the second layer 176 increases in thickness from the second light incidence surface 30f toward the lateral surface 172g, then once decreases in thickness, then increases in thickness again and subsequently decreases in thickness on the side closer to the lateral surface 172g.

More specifically, when seen in the cross section perpendicular to the longitudinal direction of the first light incidence surface 30c, the interface z includes a convex curve toward the light exit surface 30a on the side closer to the lateral surface 172d, a concave curve smoothly connected to the convex curve, and a concave curve connected to the adjacent concave curve and communicating with one end of the first light incidence surface 30c on the side closer to the rear surface 30b.

Likewise, when seen in the cross section perpendicular to the longitudinal direction of the second light incidence surface 30f, the interface z includes a convex curve toward the light exit surface 30a on the side closer to the lateral surface 172g, a concave curve smoothly connected to the convex curve, and a concave curve connected to the adjacent concave curve and communicating with one end of the second light incidence surface 30f on the side closer to the rear surface 30b.

The thickness of the second layer 176 at the first light incidence surface 30c and the second light incidence surface 30f is zero.

In other words, when seen in the cross section perpendicular to the longitudinal direction of the first light incidence surface 30c, the combined particle concentration of the scattering particles (thickness of the second layer) is changed so as to have the first local maximum value in the vicinity of the first light incidence surface 30c and the second local maximum value on the side closer to the lateral surface 172d beyond the central portion of the light guide plate, the second local maximum value being larger than the first local maximum value. In addition, when seen in the cross section perpendicular to the longitudinal direction of the second light incidence surface 30f, the combined particle concentration of the scattering particles (thickness of the second layer) is changed so as to have the first local maximum value in the vicinity of the second light incidence surface 30f and the second local maximum value on the side closer to the lateral surface 172g beyond the central portion of the light guide plate, the second local maximum value being larger than the first local maximum value.

In cases where the light source is disposed only on one side of the two opposite surfaces as in the backlight units 160 and 170, by adjusting the combined particle concentration of the light guide plate (thickness of the second layer) in the cross section perpendicular to the longitudinal direction of the light incidence surface so that the concentration has the first local maximum value at a position closer to the light incidence surface and the second local maximum value which is larger than the first local maximum value on the side closer to the lateral surface beyond the central portion, light having entered through the light incidence surface can travel to a position farther from the light incidence surface even in a large and thin light guide plate, whereby outgoing light may have a luminance distribution which is high in the middle.

By adjusting the combined particle concentration so as to have the first local maximum value in the vicinity of the light incidence surface, light having entered through the light incidence surface can be sufficiently diffused in the vicinity of the light incidence surface to prevent outgoing light from the vicinity of the light incidence surface from having visible bright lines (dark lines, unevenness) which are attributable to such causes as intervals at which the light sources are disposed.

By adjusting the combined particle concentration so that the region on the side closer to the light incidence surface than the position where the combined particle concentration takes the first local maximum value has a lower combined particle concentration than the first local maximum value, return light, which is outgoing light through the light incidence surface after it once enters the light guide plate, and outgoing light from the region in the vicinity of the light incidence surface (mixing zone M), which is not used because the region is covered with the housing, can be reduced to improve the use efficiency of outgoing light through the effective region of the light exit surface (effective screen area E).

The light guide plate has the first light incidence surface and the second light incidence surface orthogonal to the first light incidence surface and light enters the light guide plate from two directions. Therefore, the light amount distribution of outgoing light can be controlled for each local region of the light exit surface to optimize the light amount distribution of outgoing light for each local region of the light exit surface, whereby the light use efficiency can be improved.

In the cases where the light source is disposed only on one side of the two opposite surfaces, the interface z may have any of various shapes in the mixing zone M located between the light incidence surface of the light guide plate and the position of the first local maximum value, as in the light guide plates shown in FIGS. 5A to 5E.

The light guide plate may be configured in the same manner as the light guide plate shown in FIG. 6 such that the first local maximum value is positioned on the light incidence surface.

In the cases where the light source is disposed only on one side of the two opposite surfaces, the rear surface of the light guide plate may be flat and inclined with respect to the direction of light travel.

The light guide plate of the invention includes two layers which contain scattering particles at different particle concentrations. However, the light guide plate is not limited thereto and may include three or more layers which are different in the scattering particle concentration.

Light may be emitted not only through the light exit surface but also from the rear surface side.

EXAMPLES

The invention will be described below in greater detail with reference to specific examples of the invention.

Example 1

In Example 1, the illuminance distribution and luminance distribution of outgoing light through the light exit surface were determined by computer simulation using a light guide plate having the interface z as shown in FIG. 6.

In the simulation, the material of the transparent resin of the light guide plate and the material of the scattering particles were modeled as PMMA and silicone, respectively. This will also apply to all the examples given below.

In Example 1, the light guide plate 150 corresponding to a 40-inch screen size was used.

More specifically, the length from the first light incidence surface 30c to the third light incidence surface 30d was set to 539 mm; the length from the second light incidence surface 30f to the fourth light incidence surface 30g to 922 mm; and the thickness to 1.5 mm.

The scattering particles to be kneaded and dispersed in the light guide plate had a center particle size of 4.5 μm.

Figure 9:
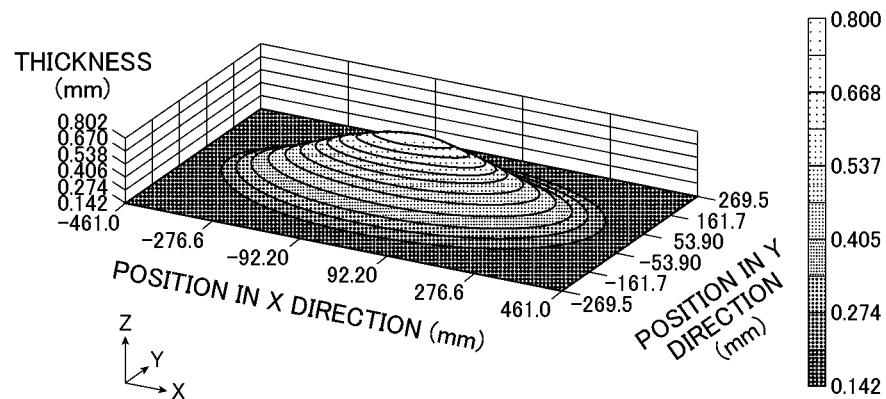
FIG. 9 is a graph showing the thickness of a second layer of the light guide plate.

The second layer had a thickness shape shown in FIG. 9. In FIG. 9, the position in the x direction corresponds to the position in the longitudinal direction of the first light incidence surface 30c and the position in the y direction corresponds to the position in the longitudinal direction of the second light incidence surface 30f.

More specifically, in the cross section perpendicular to the longitudinal direction of the first light incidence surface 30c which is formed in the central portion between the second light incidence surface 30f and the fourth light incidence surface 30g, the thickness of the second layer 154 at the position of the second local maximum value was set to 0.8 mm; the thickness of the second layer 154 at the positions of the first local maximum value (on the light incidence surfaces) to 0.15 mm; the thickness of the second layer 154 at the thinnest positions to 0.146 mm; and the distance from the central portion of the light guide plate to the thinnest positions to 246.5 mm.

In the cross section perpendicular to the longitudinal direction of the second light incidence surface 30f which is formed in the central portion of the light guide plate between the first light incidence surface 30c and the third light incidence surface 30d, the thickness of the second layer 154 at the positions of the first local maximum value (on the light incidence surfaces) was set to 0.15 mm; the thickness of the second layer 154 at the thinnest positions to 0.14 mm; and the distance from the central portion of the light guide plate to the thinnest positions to 431 mm.

The particle concentration Npo of the first layer was set to 0.0217 wt % and the particle concentration Npr of the second layer to 0.499 wt %.

The light guide plate having the shape as described above was used to measure the illuminance distribution.

Figure 10:
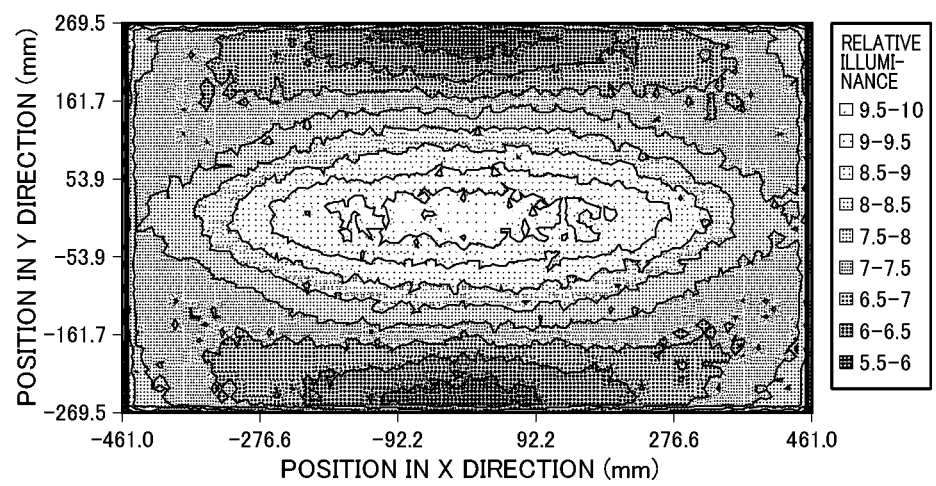
FIG. 10 is a graph showing the measurement results of the illuminance distribution of light emitted through the light exit surface of the light guide plate.

The measured illuminance distribution is shown in FIG. 10. In FIG. 10 where the horizontal axis indicates the position [mm] in the x direction and the vertical axis indicates the position [mm] in the y direction, the relative illuminance at the respective positions were shown by a gray scale.

Example 2

A light guide plate of the same type as that used in Example 1 except the shape of the interface z was used to measure the illuminance distribution.

Figure 11:
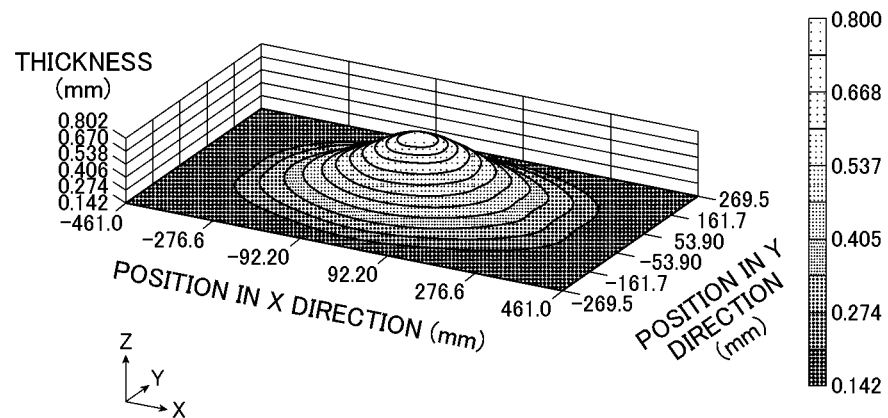
FIG. 11 is a graph showing the thickness of the second layer of the light guide plate.

The second layer of the light guide plate 150 in Example 2 had the thickness shape shown in FIG. 11.

More specifically, in the cross section perpendicular to the longitudinal direction of the first light incidence surface 30c which is formed in the central portion between the second light incidence surface 30f and the fourth light incidence surface 30g, the thickness of the second layer 154 at the position of the second local maximum value was set to 0.8 mm; the thickness of the second layer 154 at the positions of the first local maximum value (on the light incidence surfaces) to 0.15 mm; the thickness of the second layer 154 at the thinnest positions to 0.14 mm; and the distance from the central portion of the light guide plate to the thinnest positions to 246.5 mm.

In the cross section perpendicular to the longitudinal direction of the second light incidence surface 30f which is formed in the central portion of the light guide plate between the first light incidence surface 30c and the third light incidence surface 30d, the thickness of the second layer 154 at the positions of the first local maximum value (on the light incidence surfaces) was set to 0.15 mm; the thickness of the second layer 154 at the thinnest positions to 0.146 mm; and the distance from the central portion of the light guide plate to the thinnest positions to 431 mm.

The particle concentration Npo of the first layer was set to 0.0217 wt % and the particle concentration Npr of the second layer to 0.555 wt %.

Figure 12:
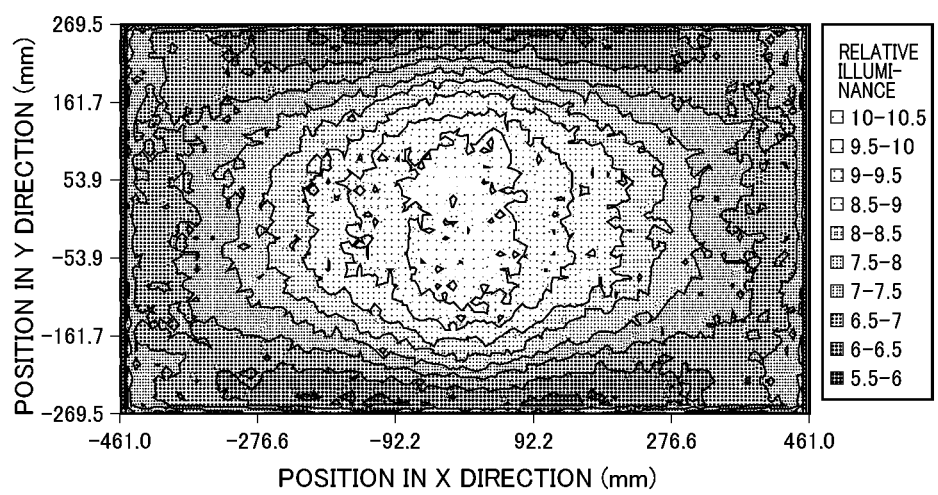
FIG. 12 is a graph showing the measurement results of the illuminance distribution of light emitted through the light exit surface of the light guide plate.

The measured illuminance distribution is shown in FIG. 12. In FIG. 12 where the horizontal axis indicates the position [mm] in the x direction and the vertical axis indicates the position [mm] in the y direction, the relative illuminance at the respective positions were shown by a gray scale.

Reference Example 1

Figure 14A:
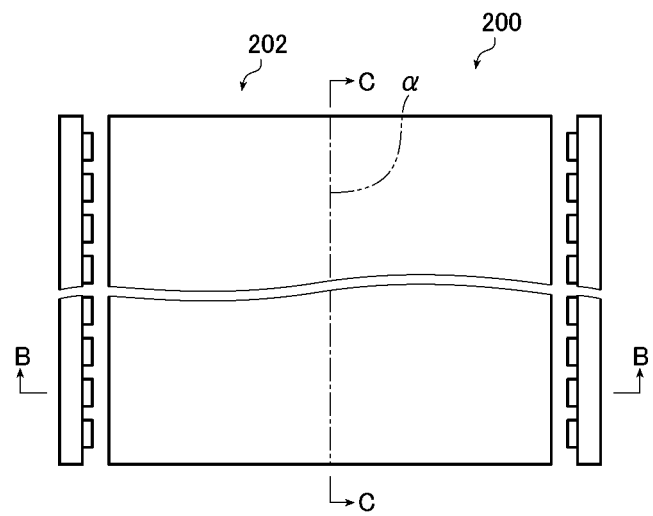
FIGS. 14A, 14B and 14C are schematic views showing an exemplary light guide plate.
Figure 14B:
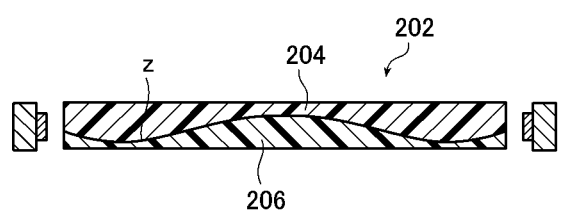
Figure 14C:
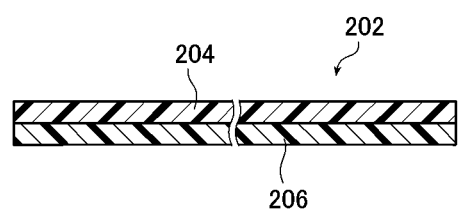

In Reference Example 1, a backlight unit 200 shown in FIGS. 14A to 14C was used.

The backlight unit 200 shown in FIGS. 14A to 14C has a configuration in which light sources are disposed on two opposite surfaces of the light guide plate, whereas light sources are not disposed on the other two opposite surfaces.

A light guide plate 202 of the backlight unit 200 includes a first layer 204 on the side closer to a light exit surface and a second layer 206 on the side closer to a rear surface. When seen in a cross section perpendicular to the longitudinal direction of surfaces on the sides on which light sources are disposed (light incidence surfaces), an interface z between the first layer 204 and the second layer 206 continuously changes so that the second layer 206 decreases in thickness from the central portion of the light exit surface toward the two light incidence surfaces, and further continuously changes so that the second layer 206 increases in thickness in the vicinities of the light incidence surfaces. When seen in a cross section perpendicular to the longitudinal direction of surfaces on the sides on which light sources are not disposed, the interface z is formed parallel to the light exit surface.

More specifically, when seen in the cross section perpendicular to the longitudinal direction of the light incidence surfaces, the interface z has the same shape as the interface z when seen in the cross section perpendicular to the longitudinal direction of the first light incidence surface 30c as formed in the central portion between the second light incidence surface 30f and the fourth light incidence surface 30g in Example 1.

The particle concentration Npo of the first layer was set to 0.0217 wt % and the particle concentration Npr of the second layer to 0.562 wt %.

In Reference Example 1, the total amount of light emitted from the two light sources was set to the same as that of light emitted from the four light sources 28 in Examples 1 and 2.

Figure 13A:
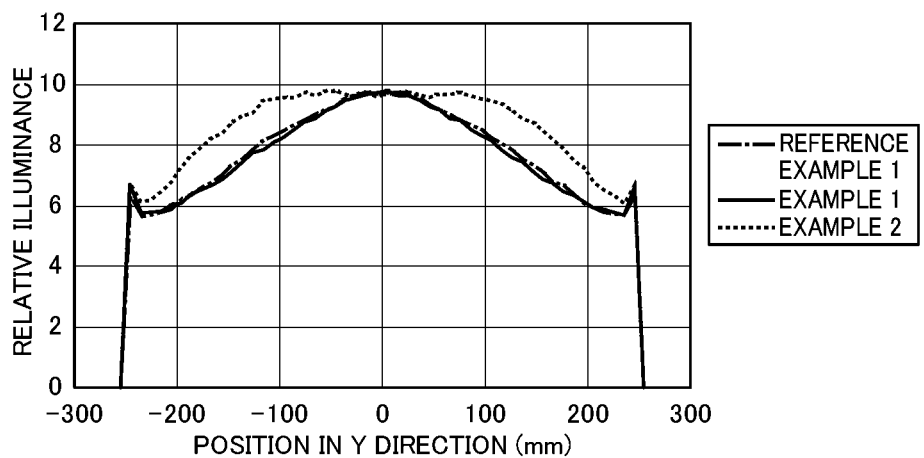
FIG. 13A and FIG. 13B are graphs showing the measurement results of the illuminance distribution of light emitted through the light exit surface of the light guide plate.
Figure 13B:
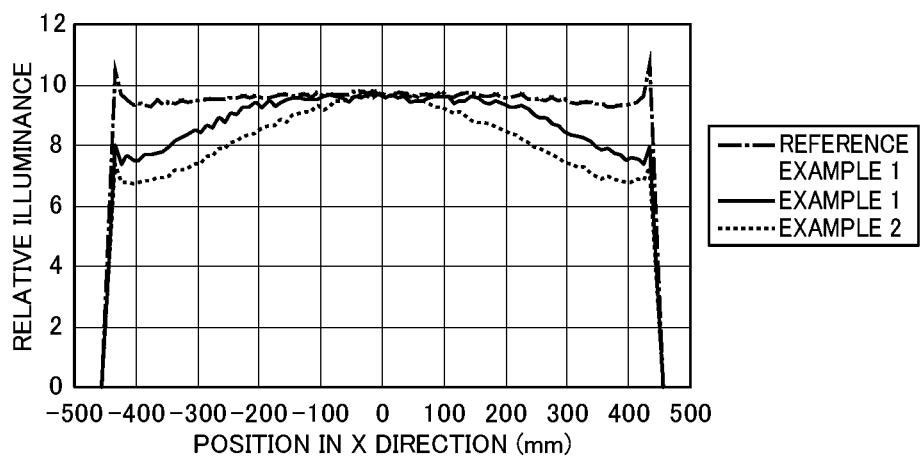

The measured illuminance distributions are shown in FIG. 13A and FIG. 13B. In FIG. 13A, the horizontal axis indicates the position [mm] in the y direction and the vertical axis indicates the relative illuminance. In FIG. 13B, the horizontal axis indicates the position [mm] in the x direction and the vertical axis indicates the relative illuminance. Example 1 is indicated by a solid line, Example 2 by a broken line and Reference Example 1 by a chain line.

As shown in FIGS. 10 and 12, the illuminance of the light guide plates 150 in Examples 1 and 2 is higher in its central portion.

As shown in FIGS. 13A and 13B, Reference Example 1 in which the light sources are disposed only on the two opposite sides shows an increased illuminance in the central portion in the direction (y direction) perpendicular to the light incidence surfaces but has a uniform illuminance distribution in the direction (x direction) parallel to the light incidence surfaces.

In contrast, in Examples 1 and 2, the illuminance can be increased in the central portion in any of the x direction and the y direction.

While the light guide plate, the planar lighting device and the liquid crystal display according to the invention have been described above in detail, the invention is not limited in any manner to the above embodiments and various improvements and modifications may be made without departing from the spirit of the invention.

What is claimed is:

1. A light guide plate comprising:
a rectangular light exit surface;
a first light incidence surface which is provided on a first end side of said light exit surface and through which light traveling in a direction substantially parallel to said light exit surface enters;
a rear surface on an opposite side to said light exit surface;
scattering particles dispersed in said light guide plate;
a second light incidence surface which is provided on a second end side orthogonal to the first end side on which said first light incidence surface is provided and through which light traveling in the direction substantially parallel to said light exit surface enters; and
two or more layers superposed on each other in a direction substantially perpendicular to said light exit surface and containing said scattering particles at different particle concentrations,
wherein thicknesses of said two or more layers in the direction perpendicular to said light exit surface change so that a combined particle concentration of said light guide plate has, in a direction substantially perpendicular to said first light incidence surface, a first local maximum value located on a side closer to said first light incidence surface and a second local maximum value located at a position farther from said first light incidence surface than a position of said first local maximum value and being larger than said first local maximum value, and
wherein the thicknesses of said two or more layers in the direction perpendicular to said light exit surface change so that the combined particle concentration of said light guide plate has, in a direction substantially perpendicular to said second light incidence surface, a first local maximum value located on a side closer to said second light incidence surface and a second local maximum value located at a position farther from said second light incidence surface than a position of said first local maximum value and being larger than said first local maximum value.

2. The light guide plate according to claim 1,
wherein said two or more layers comprise two layers including a first layer disposed on a side closer to said light exit surface and containing the scattering particles at a particle concentration Npo and a second layer disposed on a side closer to said rear surface and containing the scattering particles at a particle concentration Npr, and a thickness of said second layer in the direction perpendicular to said light exit surface continuously changes in the direction perpendicular to said first light incidence surface so as to increase with increasing distance from said first light incidence surface, then decrease and subsequently increase again, and
wherein the thickness of said second layer in the direction perpendicular to said light exit surface continuously changes in the direction perpendicular to said second light incidence surface so as to increase with increasing distance from said second light incidence surface, then decrease and subsequently increase again.

3. The light guide plate according to claim 2, wherein Npo and Npr fall within ranges satisfying Npo=0 wt % and 0.01 wt %<Npr<1.1 wt %.

4. The light guide plate according to claim 2, wherein Npo and Npr fall within ranges satisfying 0 wt %<Npo<0.15 wt % and Npo<Npr<1.1 wt %.

5. The light guide plate according to claim 1, wherein said two or more layers comprise two layers including a first layer disposed on a side closer to said light exit surface and containing the scattering particles at a particle concentration Npo and a second layer disposed on a side closer to said rear surface and containing the scattering particles at a particle concentration Npr, and a thickness of said second layer in the direction perpendicular to said light exit surface continuously changes so as to increase with increasing distance from said first and second light incidence surfaces, then decrease and subsequently increase again in all cross sections passing through a center of said light exit surface and perpendicular to said light exit surface.

6. The light guide plate according to claim 1, wherein the first local maximum value of said combined particle concentration is positioned on said first light incidence surface in the direction substantially perpendicular to said first light incidence surface.

7. The light guide plate according to claim 1, wherein the first local maximum value of said combined particle concentration is positioned on said second light incidence surface in the direction substantially perpendicular to said second light incidence surface.

8. The light guide plate according to claim 1, further comprising a third light incidence surface which is provided on a surface opposite to said first light incidence surface and through which light traveling in the direction substantially parallel to said light exit surface enters, said combined particle concentration having, in the direction perpendicular to said first light incidence surface, the first local maximum value on each of sides where said first and third light incidence surfaces are formed.

9. The light guide plate according to claim 1, further comprising a fourth light incidence surface which is provided on a surface opposite to said second light incidence surface and through which light traveling in the direction substantially parallel to said light exit surface enters, said combined particle concentration having, in the direction perpendicular to said second light incidence surface, the first local maximum value on each of sides where said second and fourth light incidence surfaces are formed.

10. The light guide plate according to claim 1, further comprising a third light incidence surface which is provided on a surface opposite to said first light incidence surface and through which light traveling in the direction substantially parallel to said light exit surface enters, and a fourth light incidence surface which is provided on a surface opposite to said second light incidence surface and through which light traveling in the direction substantially parallel to said light exit surface enters, said combined particle concentration having, in the direction perpendicular to said first light incidence surface, the first local maximum value on each of sides where said first and third light incidence surfaces are formed, and said combined particle concentration having, in the direction perpendicular to said second light incidence surface, the first local maximum value on each of sides where said second and fourth light incidence surfaces are formed.

11. The light guide plate according to claim 10, wherein said second layer has a maximum thickness at a central portion of said light exit surface.

12. The light guide plate according to claim 1, wherein said rear surface is a flat surface parallel to said light exit surface.

13. A planar lighting device comprising:
the light guide plate according to claim 1;
a light source unit including a plurality of point light sources disposed so as to face said first and second light incidence surfaces of said light guide plate and support members for supporting said plurality of point light sources; and a housing containing said light guide plate and said light source unit and having an opening on a side closer to said light exit surface of said light guide plate, said opening being smaller than said light exit surface, wherein the first local maximum value of said combined particle concentration of said light guide plate is located at a position corresponding to a vicinity of an edge of said opening of said housing.

* * * * *